(12) United States Patent
MacDonald

(10) Patent No.: US 12,344,056 B2
(45) Date of Patent: Jul. 1, 2025

(54) MODULAR NON-ELECTRIC AND/OR ELECTRIC POWERED WHEELED CART CAPABLE OF ATTACHING TO A VEHICLE

(71) Applicant: Edwin Arthur MacDonald, Mckinney, TX (US)

(72) Inventor: Edwin Arthur MacDonald, Mckinney, TX (US)

( * ) Notice: Subject to any disclaimer, the term of this patent is extended or adjusted under 35 U.S.C. 154(b) by 75 days.

(21) Appl. No.: 17/463,512

(22) Filed: Aug. 31, 2021

(65) Prior Publication Data

US 2022/0063362 A1 Mar. 3, 2022

Related U.S. Application Data

(63) Continuation-in-part of application No. 29/748,675, filed on Aug. 31, 2020, now Pat. No. Des. 1,015,675.

(51) Int. Cl.
| | |
|---|---|
| *B60D 1/54* | (2006.01) |
| *B60D 1/00* | (2006.01) |
| *B62B 3/02* | (2006.01) |
| *B62B 5/00* | (2006.01) |
| *B62B 5/06* | (2006.01) |

(52) U.S. Cl.
CPC .................. *B60D 1/54* (2013.01); *B62B 3/02* (2013.01); *B62B 5/0033* (2013.01); *B62B 5/0059* (2013.01); *B62B 5/064* (2013.01); *B60D 2001/005* (2013.01)

(58) Field of Classification Search
CPC ...... B60D 1/54; B60D 2001/005; B62B 3/02; B62B 5/0033; B62B 5/0059; B62B 5/064
See application file for complete search history.

(56) References Cited

U.S. PATENT DOCUMENTS

| | | | |
|---|---|---|---|
| 2,658,769 A | 11/1953 | Foreney | |
| 5,322,315 A | 6/1994 | Cartsen | |
| 6,612,615 B1 | 9/2003 | Dimand | |
| 7,185,911 B1 | 3/2007 | Leverett | |
| 8,573,628 B2 | 11/2013 | Mcconnell | |
| 9,375,986 B1 | 6/2016 | Dykstra | |
| 9,616,820 B2 | 4/2017 | Raley | |
| 10,053,128 B2 | 8/2018 | Rackleff et al. | |
| 10,065,566 B1 | 9/2018 | Harbaugh | |
| 10,239,462 B2 | 3/2019 | Sorey et al. | |
| 10,266,095 B1 * | 4/2019 | Berg | B60P 3/14 |
| 11,613,288 B2 * | 3/2023 | Burns | |

(Continued)

OTHER PUBLICATIONS

Gorilla Cart commerically available at Home Depot images downloaded from: https://www.homedepot.com/p/GORILLA-CARTS-4-cu-ft-Steel-Utility-Cart-GCG-2140/309542653?MERCH=REC-_-rv_search_plp_rr-_-NA-_-309542653-_-N. (6 pages).

*Primary Examiner* — James A Shriver, II
*Assistant Examiner* — Nicholas R. Kandas
(74) *Attorney, Agent, or Firm* — Ferguson Braswell Fraser Kubasta PC

(57) ABSTRACT

In various implementations, a modular wheeled cart may provide users with flexibility in use and transport. The modular wheeled cart may include interchangeable top components that allow the cart to be utilized as a wagon, a flatbed, an A-frame cart, etc. The modular wheeled cart may include a hitch, which allows the cart to be coupled to a vehicle. The wheeled cart may be motorized and/or may include a removable battery for ease of use.

20 Claims, 27 Drawing Sheets

(56) References Cited

U.S. PATENT DOCUMENTS

| | | | |
|---|---|---|---|
| 2005/0040660 A1* | 2/2005 | Evans | B60R 19/18 |
| | | | 293/120 |
| 2006/0145461 A1 | 7/2006 | Anderson | |
| 2009/0146394 A1 | 6/2009 | Seivert et al. | |
| 2009/0232633 A1 | 9/2009 | Stamps et al. | |
| 2010/0066069 A1 | 3/2010 | Bradshaw | |
| 2010/0109268 A1* | 5/2010 | Koehler | B62B 3/008 |
| | | | 280/33.991 |
| 2011/0084466 A1* | 4/2011 | Olsen | B60D 1/06 |
| | | | 280/491.2 |
| 2012/0068439 A1 | 3/2012 | Fast | |
| 2015/0225008 A1* | 8/2015 | Pinchas | B62B 5/0033 |
| | | | 180/12 |
| 2016/0272229 A1* | 9/2016 | Buckner | |
| 2019/0232992 A1* | 8/2019 | Bondaryk | B62B 3/005 |
| 2020/0215955 A1* | 7/2020 | Aljallis | B60Q 1/04 |

* cited by examiner

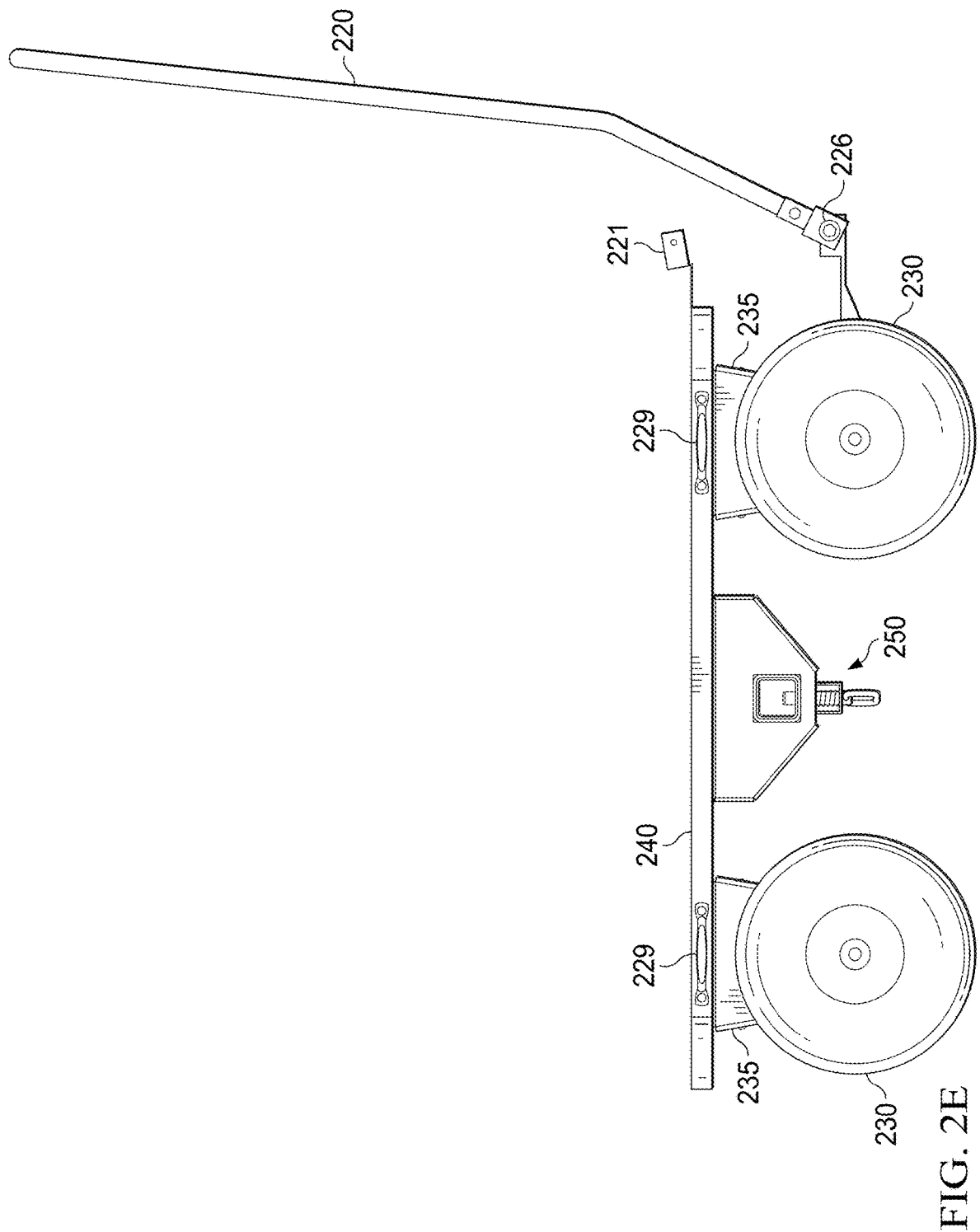

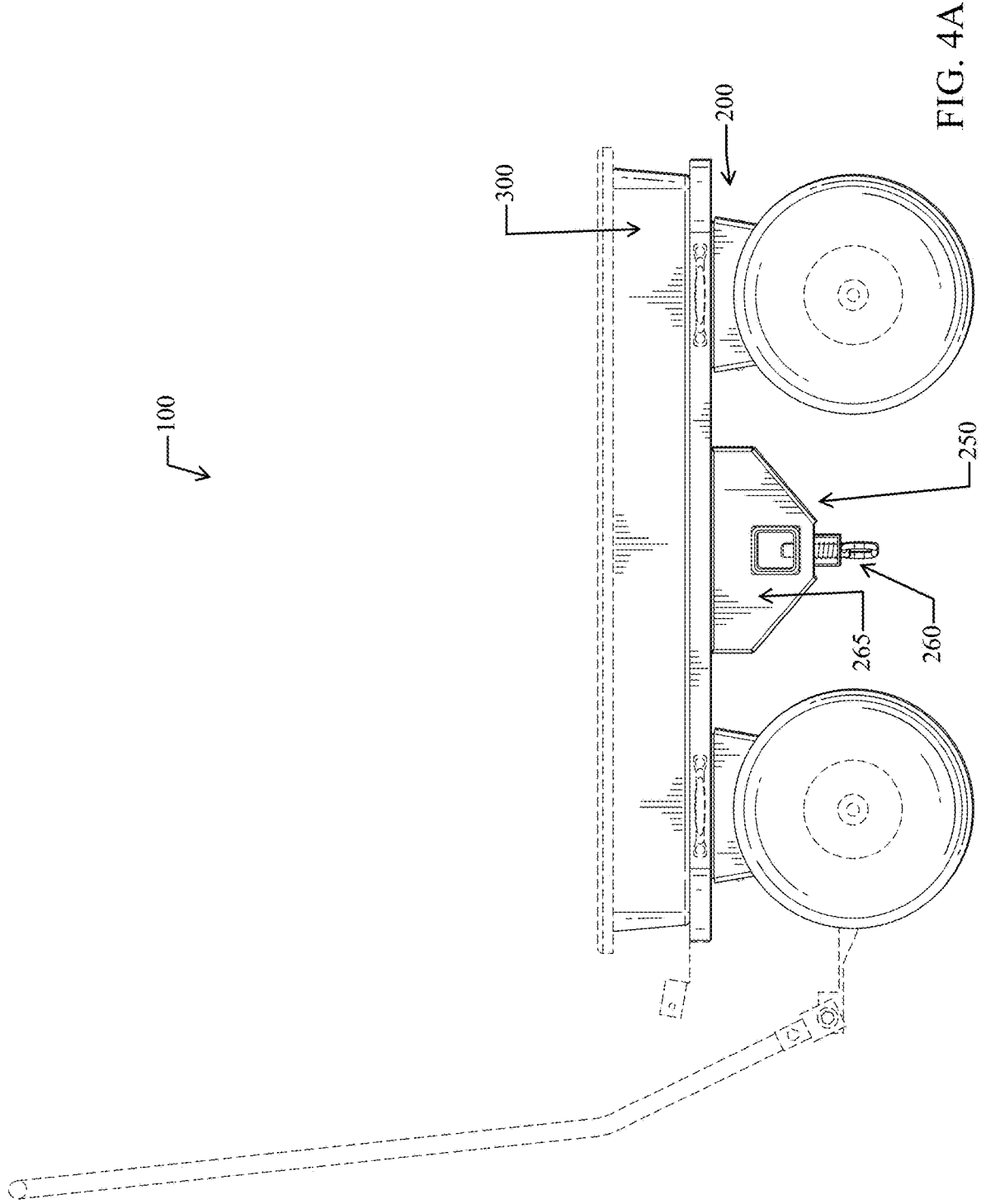

MODULAR NON-ELECTRIC AND/OR ELECTRIC POWERED WHEELED CART CAPABLE OF ATTACHING TO A VEHICLE

CROSS-REFERENCE TO RELATED APPLICATION

This application is a continuation in part of U.S. Design patent application Ser. No. 29/748,675 entitled "Wheeled Cart Capable of Attaching to a Vehicle" and filed on Aug. 31, 2020, which is incorporated fully herein.

TECHNICAL FIELD

The present invention relates to a wheeled cart capable of attaching to a vehicle.

BACKGROUND

Wheeled carts are commonly used to transport items. Carts may be difficult and/or undesirable to transport inside vehicles (e.g., due to size, soiling, convenience, etc.). While some wheeled carts are currently available that can be hitched to cars, the hitches also commonly inhibit full operation of the carts themselves, remain in an extended position from the body of the cart, involve cumbersome assembly, etc. Additionally, commonly available wheeled carts are not flexible in use, and instead are often limited to being single purpose flatbed carts, wagons, and wheelbarrows. Thus, a need exists for a simple to hitch, modular wheeled cart.

SUMMARY

In various implementations, a modular wheeled cart may be provided that is capable of being coupled to a vehicle hitch. The wheeled cart may be non-electric powered (e.g., gas and/or manual powered) and/or electric powered. The cart may have a platform on which interchangeable and/or removable top members may be disposed and/or coupled. Providing a wheeled cart with interchangeable top members may increase use and user satisfaction of the wheeled cart.

In various implementations, a modular wheeled cart may include a frame and one or more top members. The frame includes a first end, second opposing end, a width, and a length (e.g., between the first end and the second end of the frame). The frame may include a handle, wheel assembly, and a platform. The handle may be coupled to the frame. For example, the handle may have a first end (e.g., that a user might grip to move the cart) and a second end coupled to the frame. The handle may include a shaft and a grip. The handle may include a shaft hinge and the shaft may be rotatable about the shaft hinge. Use of the shaft hinge may ease user control of the direction and/or movement of the wheeled cart. The frame may include at least four wheels coupled to the frame. For example, a first set of wheels may be disposed proximate the first end of the frame and the second end of the wheels may be disposed proximate the second end of the frame. The frame may include a platform coupled to the wheels (e.g., directly and/or indirectly). The platform may include lateral supports and at least one longitudinal support. The longitudinal support may couple one or more of the lateral supports together. The platform may include one or more open regions between the lateral supports and/or longitudinal support(s). The platform may include one or more platform handles coupled to at least one of the longitudinal supports. The frame may also include a hitch capable of coupling with a vehicle hitch of a vehicle. The hitch may be extendable between a first position and one or more second positions. The wheeled cart may also include one or more top members. A top member may be removably coupled to the platform. For example, the top member may include a set of side walls, an A-frame, and/or a container.

Implementations may include one or more of the following features. The wheeled cart may include an appropriate extending hitch. For example, the hitch may include a telescoping hitch. The telescoping hitch may be disposed between the first side and the second side of the frame. The hitch may be disposed between the first set of wheels and the second set of wheels. The telescoping hitch may include a first member, a second member, and a locking member. The first member may be (e.g., directly or indirectly) coupled to the platform. The first member may include a lumen and one or more openings. The lumen may extend along at least a portion of the length of the first member. The first member may include a first opening (e.g., which may receive portions of the locking member). The first opening of the first member may be disposed proximate the first side of the frame and/or first end of the first member. The second member may be at least partially disposable in the lumen of the first member. For example, a first end of the second member may be couplable to a vehicle hitch and a second end of the second member may be disposed at least partially in the lumen of the first member. The second member may include one or more openings, such as a second opening, a third opening (e.g., to facilitate coupling with the vehicle hitch), and/or fourth opening (e.g., to retain the second member at least partially in the first member while extended). The second opening of the second member may be configured to receive at least a portion (e.g., a pin) of the locking member. The second opening may be disposed proximate the first side of the frame and/or first end of the second member. A locking member of the hitch may couple the first member and the second member together and/or control retain the hitch in a first and/or second position. The locking member may include pin and a spring disposed about the pin. The pin may be disposed through a lock that may be disposed about the spring. The pin may be disposed through the first opening of the telescoping hitch and at least a portion of the pin may be disposed in the lumen of the first member. To withdraw the pin from at least the first opening of the first member and/or the second opening of the second member, a force may be applied to the pin to compress the spring and withdrawn the pin from the lumen of the first member. When the force is released, the spring of the locking member may cause the pin to reenter the lumen of the first member and/or couple with the second member. To position the telescoping hitch in one of the second positions, the pin may be withdrawn from the second opening in the second member to allow the second member to extend away from the frame. When the telescoping hitch is retracted to dispose the telescoping hitch in the first position, the pin may be disposed in the first opening of the first member and the second opening of the second member of the telescoping hitch.

As another nonlimiting example, the telescoping hitch may include a channel and protrusions while allowing the hitch to slide between a first and second position. The telescoping hitch may be disposed between the first side and the second side of the frame. The hitch may be disposed between the first set of wheels and the second set of wheels. The telescoping hitch may include a first member, a second member, and a locking member. The first member may be (e.g., directly or indirectly) coupled to the platform. The telescoping hitch may include a first C-shaped member and a second member. The first C-shaped member may be coupled to the platform. The first member may include a C-shaped cross-section and a length perpendicular to the c-shaped cross-section. The channel may be disposed in between walls of the C-shaped cross-section. The first member may include a first interior recess extending along at least a portion of a length of the first member and/or a second interior recess extending along at least a portion of the length of the second member. The first member may include one or more openings, such as a first opening. The first opening may receive at least a portion of a locking member of the hitch. The second member may be at least partially disposed in the channel of the first member. The second member may include a first protrusion capable of being at least partially received in the channel of the first member and/or second protrusion capable of being at least partially received in the channel of the first member. The first protrusion and/or the second protrusion may extend along an exterior of the second member. The second member may include one or more openings, such as a second opening, a third opening (e.g., to facilitate coupling with the vehicle hitch), and/or fourth opening (e.g., to retain the second member at least partially in the first member while extended). The interior recess(es) of the first member may at least partially retain the second member in the channel of the first member. The hitch may include a locking member. A locking member of the hitch may couple the first member and the second member together and/or control retain the hitch in a first and/or second position. The locking member may include pin and a spring disposed about the pin. The pin may be disposed through a lock that may be disposed about the spring. The pin may be disposed through the first opening of the telescoping hitch and at least a portion of the pin may be disposed in the lumen of the first member. To withdraw the pin from at least the first opening of the first member and/or the second opening of the second member, a force may be applied to the pin to compress the spring and withdrawn the pin from the lumen of the first member. When the force is released, the spring of the locking member may cause the pin to reenter the lumen of the first member and/or couple with the second member. To position the telescoping hitch in one of the second positions, the pin may be withdrawn from the second opening in the second member to allow the second member to extend away from the frame. When the telescoping hitch is retracted to dispose the telescoping hitch in the first position, the pin may be disposed in the first opening of the first member and the second opening of the second member of the telescoping hitch.

As another example, the hitch may include a swing out hitch. The swing hitch may be coupled to the platform. The swing hitch may be disposed between the first side and the second side and between the first set of wheels and the second set of wheels. The swing hitch may include a first member, a second member, and a locking member. The first member may be coupled at a first end to the first end of the bracket assembly and coupled at a second end to the second end of the bracket assembly. The second member may be disposed proximate the first end of the bracket assembly and coupled to the first member via a locking member. The second member may include a first end disposed proximate the first end of the first member and a second end capable of coupling with a vehicle hitch. The locking member may include a hinge and a pin and spring assembly. The hinge may allow the second member to rotate about the hinge. The pin and spring assembly may release the second member disposed in a first position to allow the second member to rotate to a second position. When the second member is in the second position the second member may extend outward from the frame and the first member. The second member may be approximately parallel to the first member when the second member is in the second position. The hinge may be disposed below the pin and spring assembly.

Implementations may include one or more of the following features. A wheeled cart may include at least one wheel proximate each corner. In various implementations, the hitch may be coupled to the frame and/or platform by a bracket assembly. The bracket assembly may couple to the frame (e.g., proximate a first side and a second side of the frame) and the first member of the hitch may couple to the bracket assembly. The first bracket and the second bracket may be coupled to one or more of the lateral members of the frame. The first bracket may include a first aperture and/or the second bracket may include a second aperture through which the first member of the telescoping hitch is disposed. The first member may be coupled to the first and/or second brackets. The wheeled cart may include a motor assembly to drive the wheels of the wheeled cart. The motor assembly may be an electric motor assembly. The motor assembly may be coupled to the frame (e.g., at least partially within a separation module) and configured to drive two or more of the at least four wheels. The frame may include a battery channel (e.g., within a separation module and/or other parts of the frame). The battery channel may receive a removable battery such that when the removable battery is inserted into the channel it is capable of coupling with the motor assembly to provide power to the motor assembly. The handle of the wheeled cart may include a lock 221. The lock may allow the shaft of the handle to be retained in the first position of the handle, as illustrated in FIG. 2B. The lock 221 may be coupled to the platform 240 of the frame, in some implementations, as illustrated in FIG. 2D. The modular wheeled cart may include one or more modular top components coupled to one or more of the lateral members of the frame (e.g., via fasteners). The frame of the cart may include four or more platform handles disposed on lateral member(s) of the frame. At least two of the handles may be disposed on opposing sides of the frame relative to each other. The grip of the handle may be C shaped. The handle of the modular wheeled cart may include an electronic twist throttle. The electronic twist throttle may be coupled to an electronic controller of the electronic motor assembly, which controls a speed of an electronic motor of the electronic motor assembly. The frame of the wheeled cart may include separation member(s) that allows a first axle coupling the first set of wheels and the second axle coupling the second set of wheels to be disposed at a distance from the platform of the frame. The open regions of the platform may allow object(s) and/or top member(s) to be coupled to the platform via strapping disposed about one or more of the lateral members of the platform.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 2E illustrates an implementation of a second side view of the example frame illustrated in FIG. 2A.

FIG. 4A illustrates an implementation of a side view of an example wheeled cart with a telescoping hitch in the first position (e.g., unextended or retracted).

Like reference symbols in the various drawings indicate like elements.

DETAILED DESCRIPTION

In various implementations, a modular wheeled cart may provide users with cart that has flexibility in use and transport. A modular wheeled cart may be customized based on intended use increasing flexibility of the cart and user satisfaction. The modular wheeled cart may include interchangeable top components that allow the cart to be utilized, for example, as a wagon, a flatbed, an A-frame cart, etc. The modular wheeled cart may include a hitch that allows the cart to be coupled to a vehicle hitch. The wheeled cart may be motorized and/or may include a removable battery to power the motor for ease of use.

Figure 1:
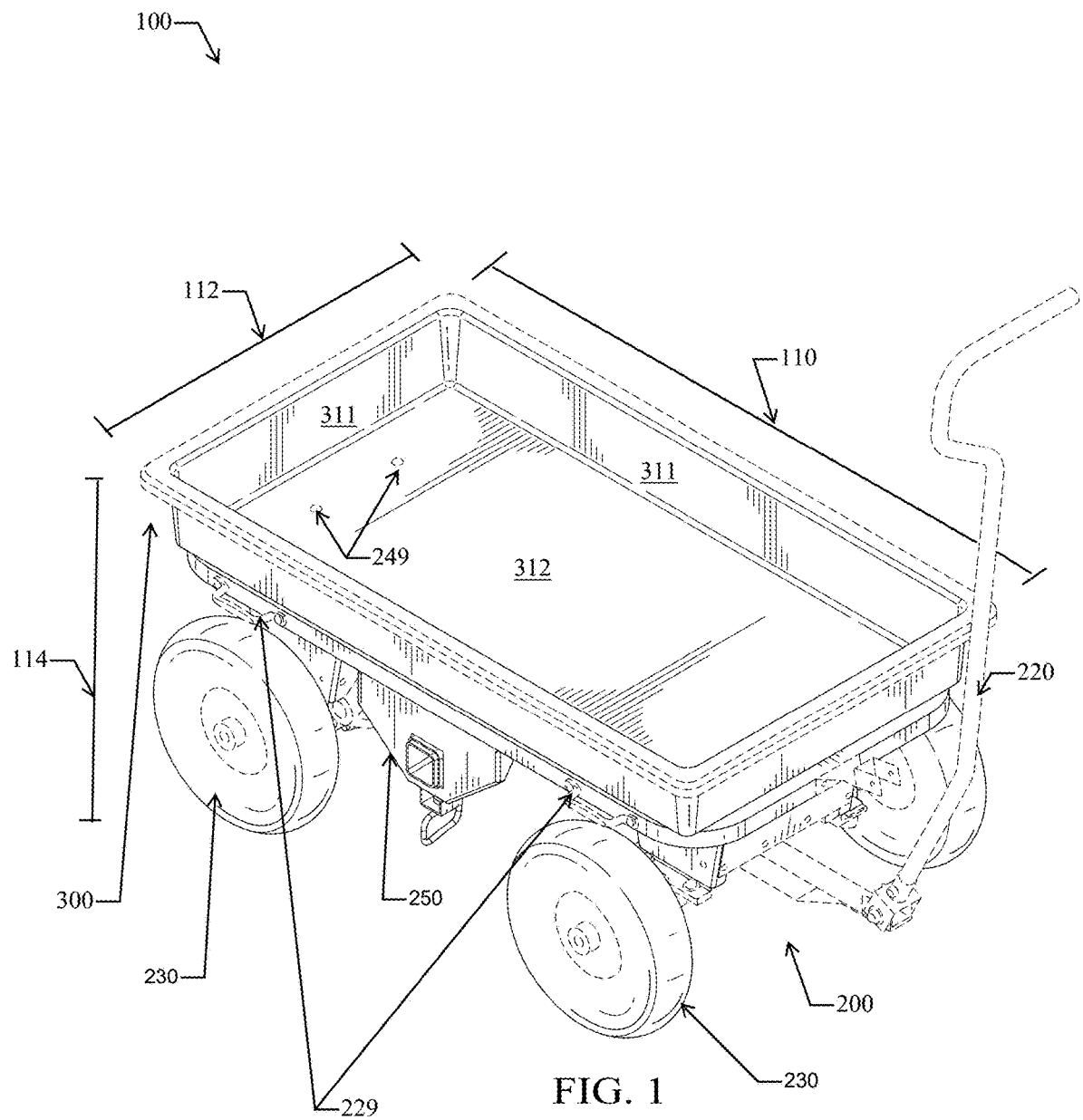
FIG. 1 illustrates an implementation of a top perspective view of an example wheeled cart, with an extendable hitch that attachable to a vehicle.

FIG. 1 illustrates an implementation of an example wheeled cart 100. The wheeled cart 100 may include a frame 200 and a top member 300. The top member may be removably coupled to the frame of the wheeled cart to allow interchangeability with other types of top members. The wheeled cart 100 may have a length 110, a width 112, and a height 114.

FIGS. 2A-2H illustrates various views of an implementation of an example frame 200. The frame 200 of the wheeled cart may include a first end 210 and a second end 212. The frame may include a length 215, a width 217, and a height 219.

The frame may include one or more handles. As illustrated, a handle 220 may be gripped by a user to move (e.g., pull and/or push) the wheeled cart 100. The handle 220 may include a grip 222 and a shaft 224. The grip 222 of the handle 220 may have any appropriate shape. For example, the handle may be O-shaped, hooked, C-shaped, T-shaped, etc. The grip may be disposed at a first end of the handle. The second opposing end of the handle may be coupled to the frame. The shaft of the handle may have any appropriate shape. For example, the shaft may include straight and/or bent portions.

The shaft of the handle may segmented, in some implementations. A segmented shaft may allow the shaft to be disposed in a first position for storage, towing, etc. and one or more second positions to facilitate movement of the cart. As illustrated, a shaft hinge 226 may couple a first segment 227 and a second segment 228 of the shaft. The shaft hinge 226 may allow the first segment 227 of the shaft to rotate about the shaft hinge. When the handle is in one or more of the second positions, as illustrated in FIG. 2, the rotation may allow movement of the handle to facilitate pulling and/or pushing of the wheeled cart 100. The rotation may allow the shaft to be disposed in the first position in which the first segment of the handle is rotated to become approximately parallel to the second segment of the handle (e.g., under the frame). The rotation may allow the shaft of the handle to be dispose in a second position where the handle contacts a handle lock and/or the platform (e.g., for storage, etc.).

In some implementations, the shaft is extendable. The shaft may be telescoping and/or otherwise capable of extending and collapsing to create handles of different lengths.

The wheeled cart may include two or more wheels 230. In some implementations, greater than two or fewer than two wheels may be coupled to the frame (e.g., based on potential uses). In some implementations, double wheels may be utilized with the wheeled cart. As illustrated, the frame 200 of the cart includes two set of wheels. A first set of wheels proximate a first end 210 of the frame 200 and a second set of wheels proximate the second end 212 of the frame. As illustrated, the first set of wheels may include a first wheel and a second wheel. The second set of wheels may include a third wheel and a fourth wheel. In some implementations, at least one wheel may be positioned proximate each corner (e.g., for stability, ease of movement, etc.).

Figure 2A:
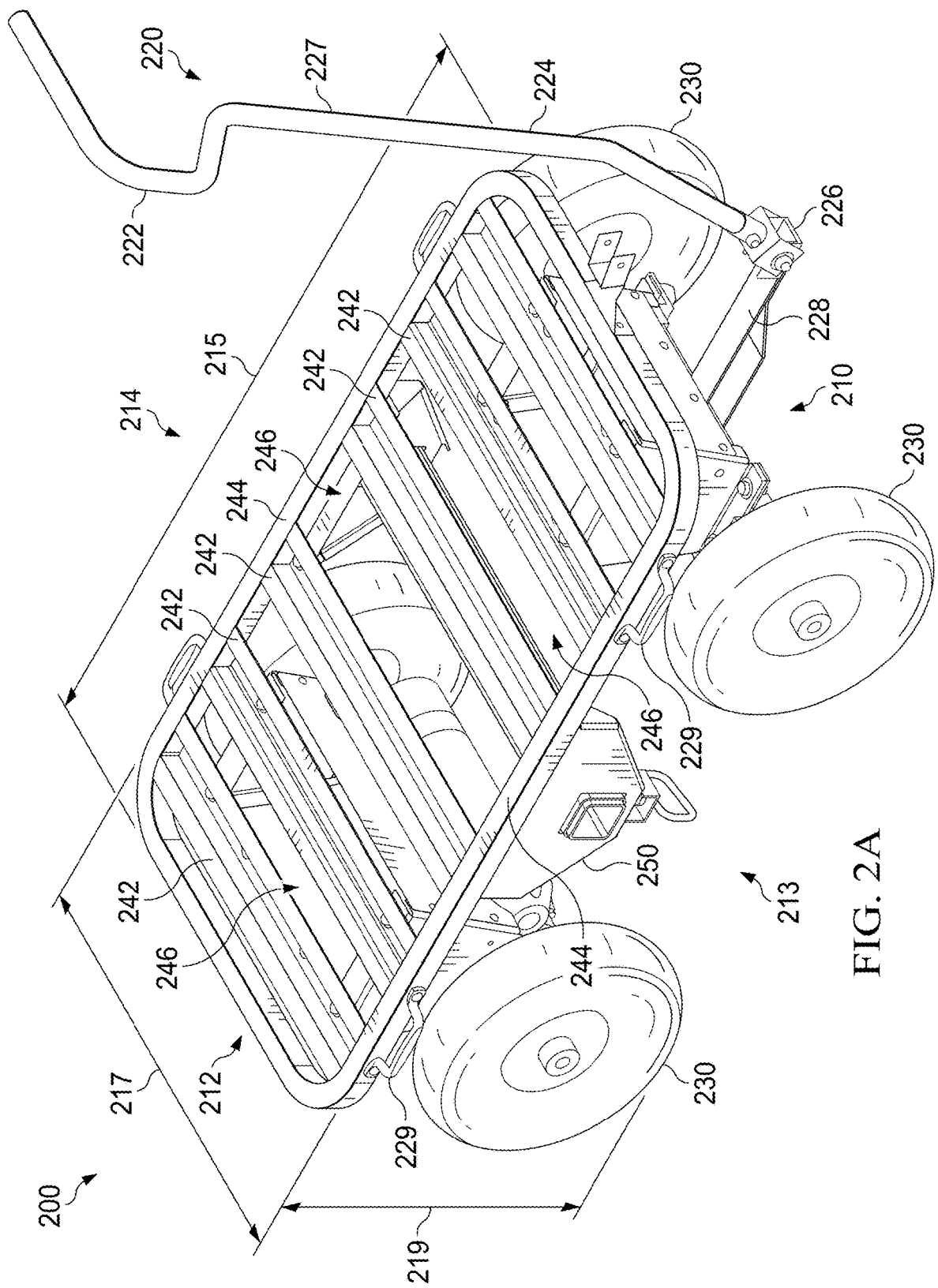
FIG. 2A illustrates an implementation of a top perspective view of an example frame of a wheeled cart.
Figure 2B:
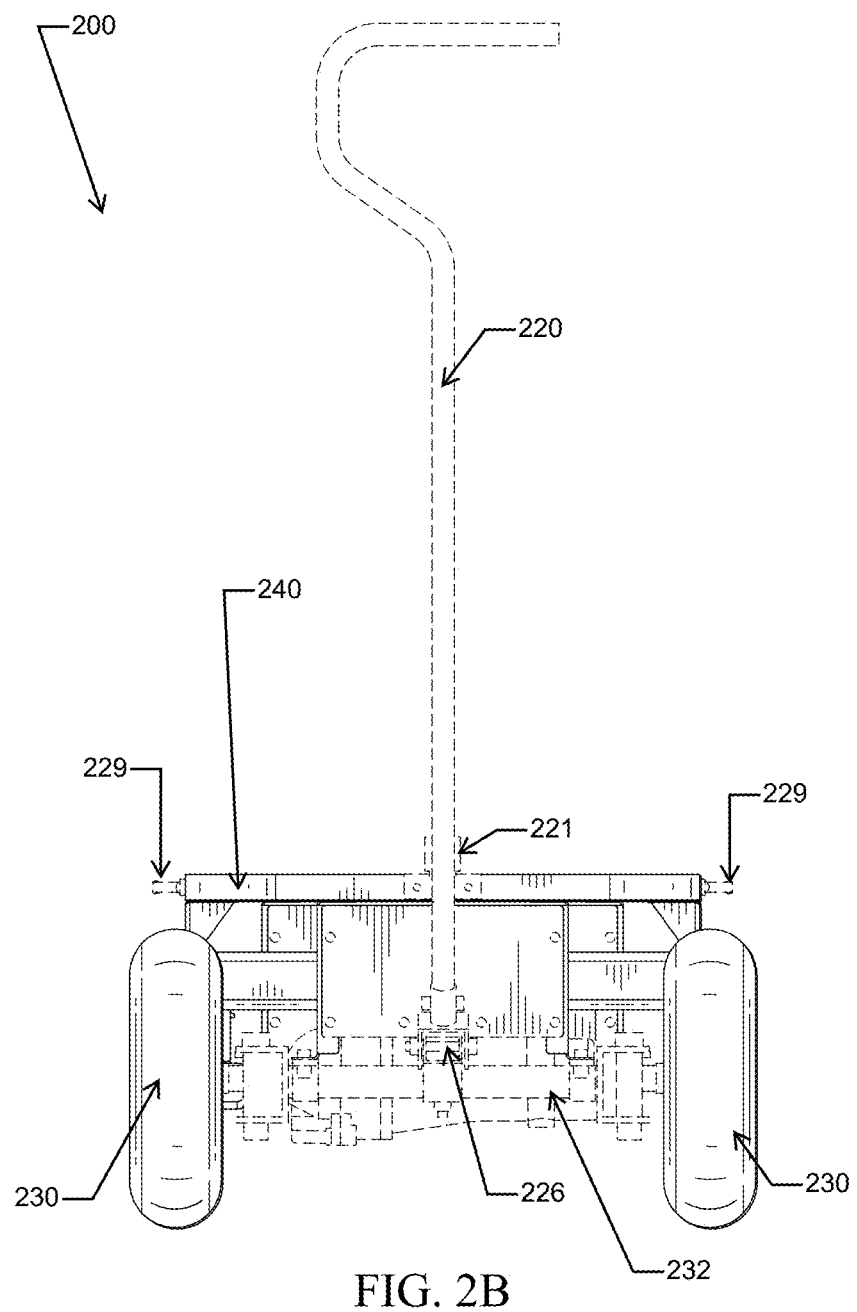
FIG. 2B illustrates an implementation of front perspective view of the example frame illustrated in FIG. 2A.
Figure 2C:
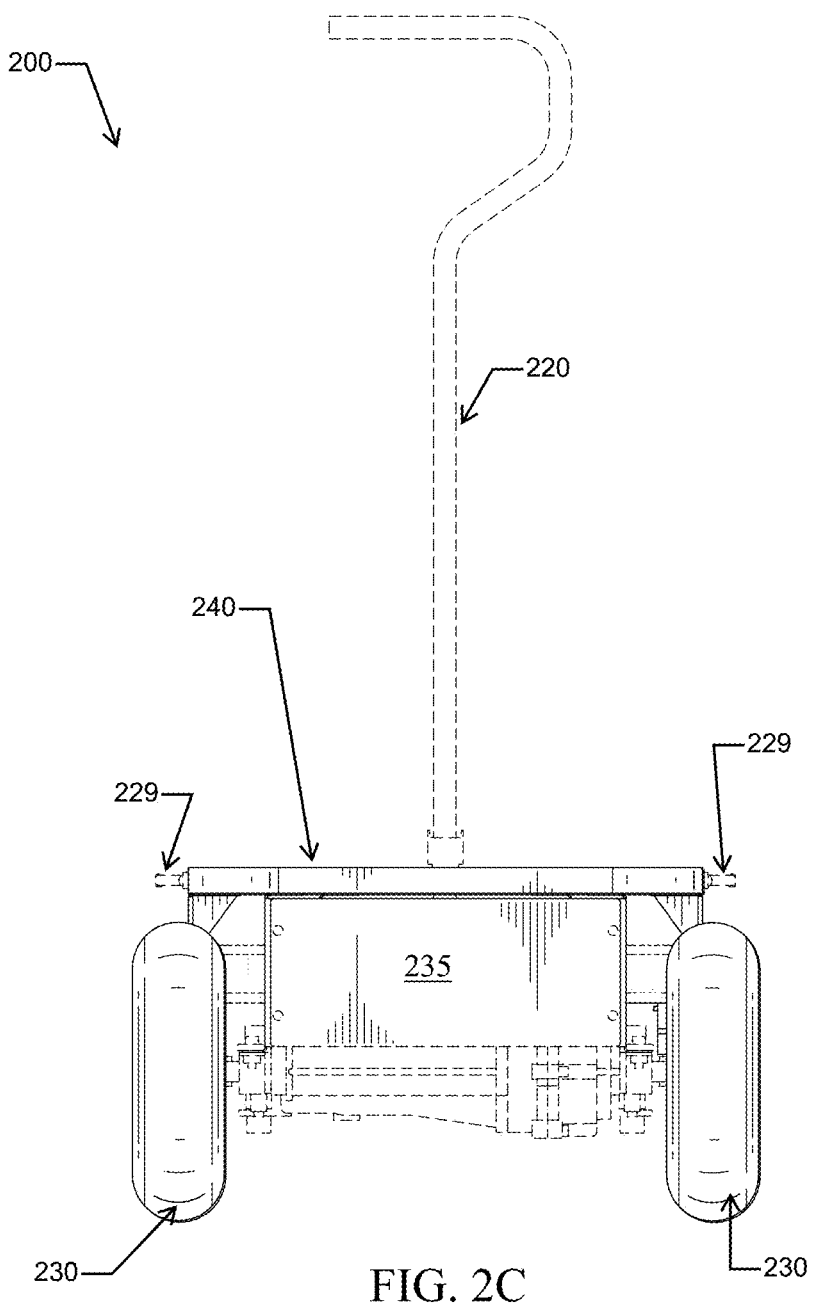
FIG. 2C illustrates an implementation of a back view of the example frame illustrated in FIG. 2A.
Figure 2D:
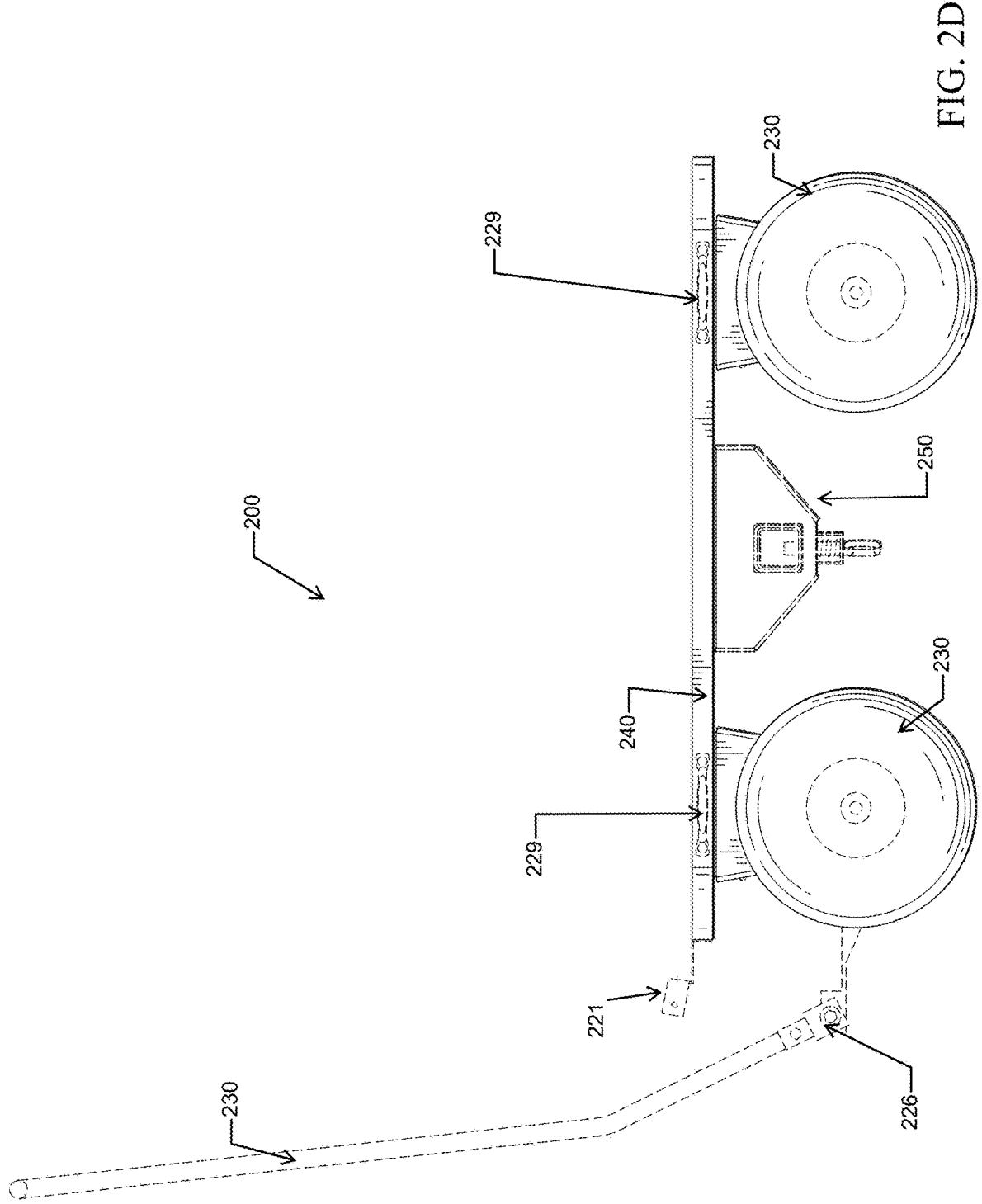
FIG. 2D illustrates an implementation of a first side view of the example frame illustrated in FIG. 2A.
Figure 2F:
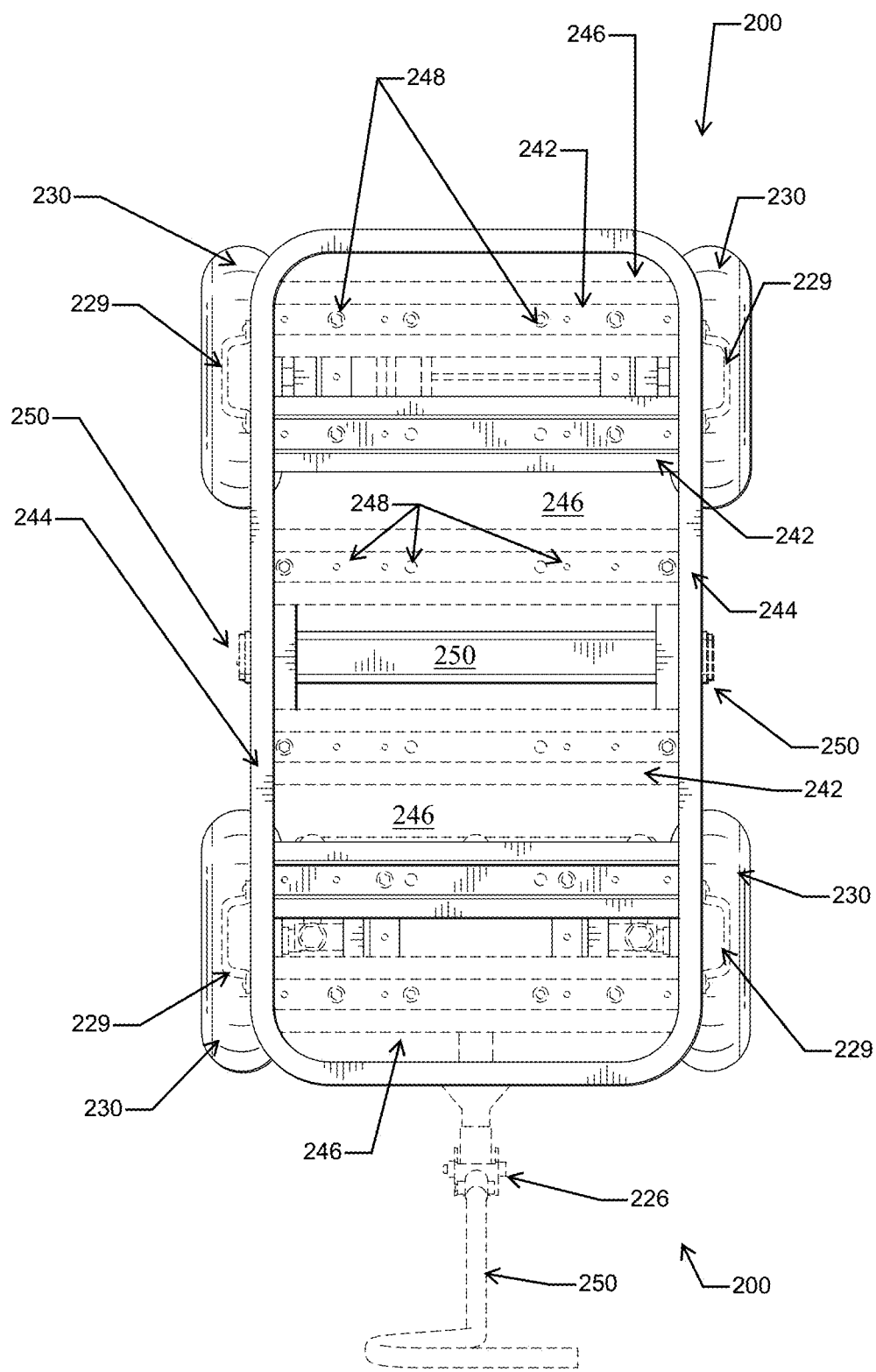
FIG. 2F illustrates an implementation of a top view of the example frame illustrated in FIG. 2A.
Figure 2G:
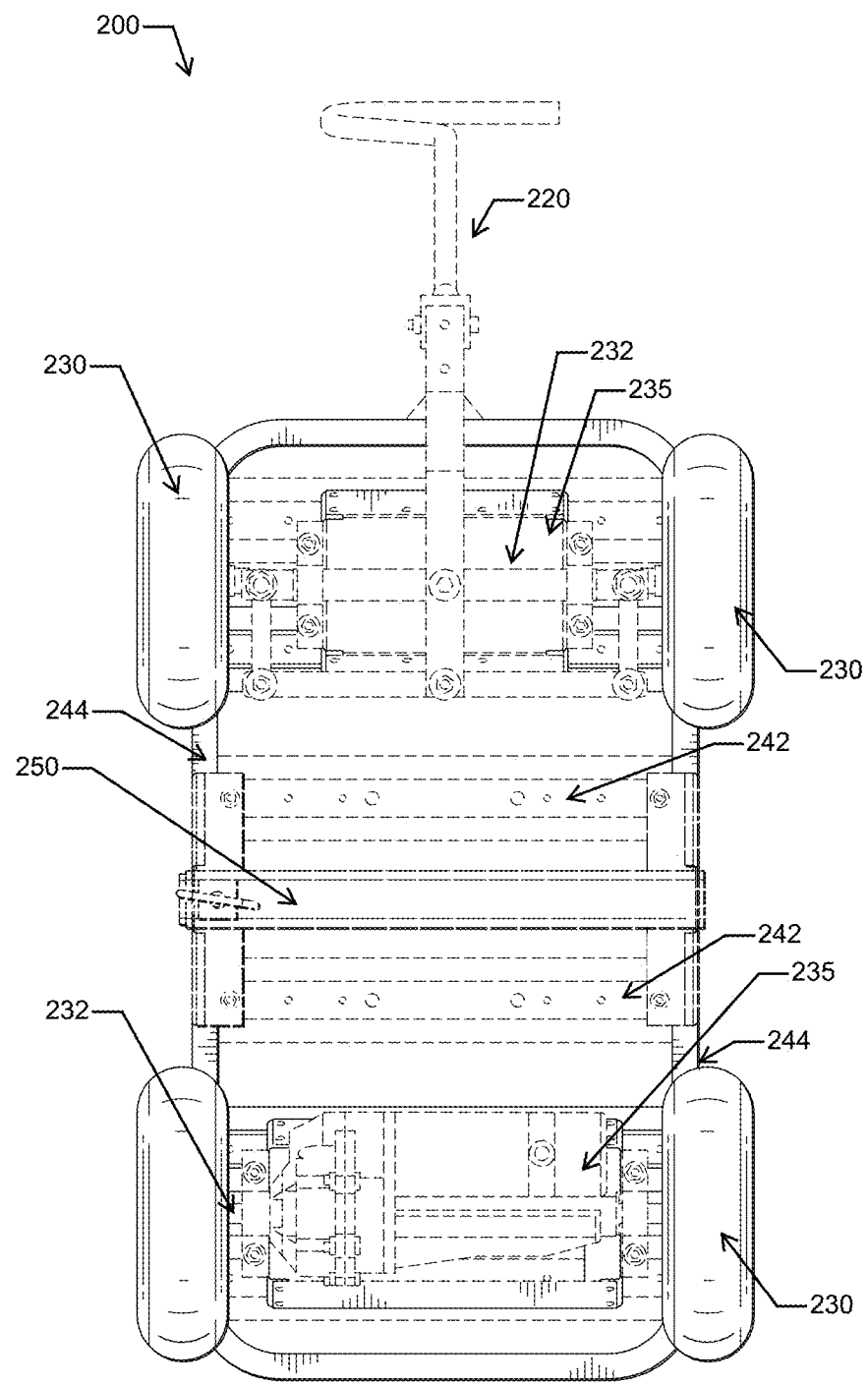
FIG. 2G illustrates an implementation of a bottom view of the example frame illustrated in FIG. 2A.
Figure 2H:
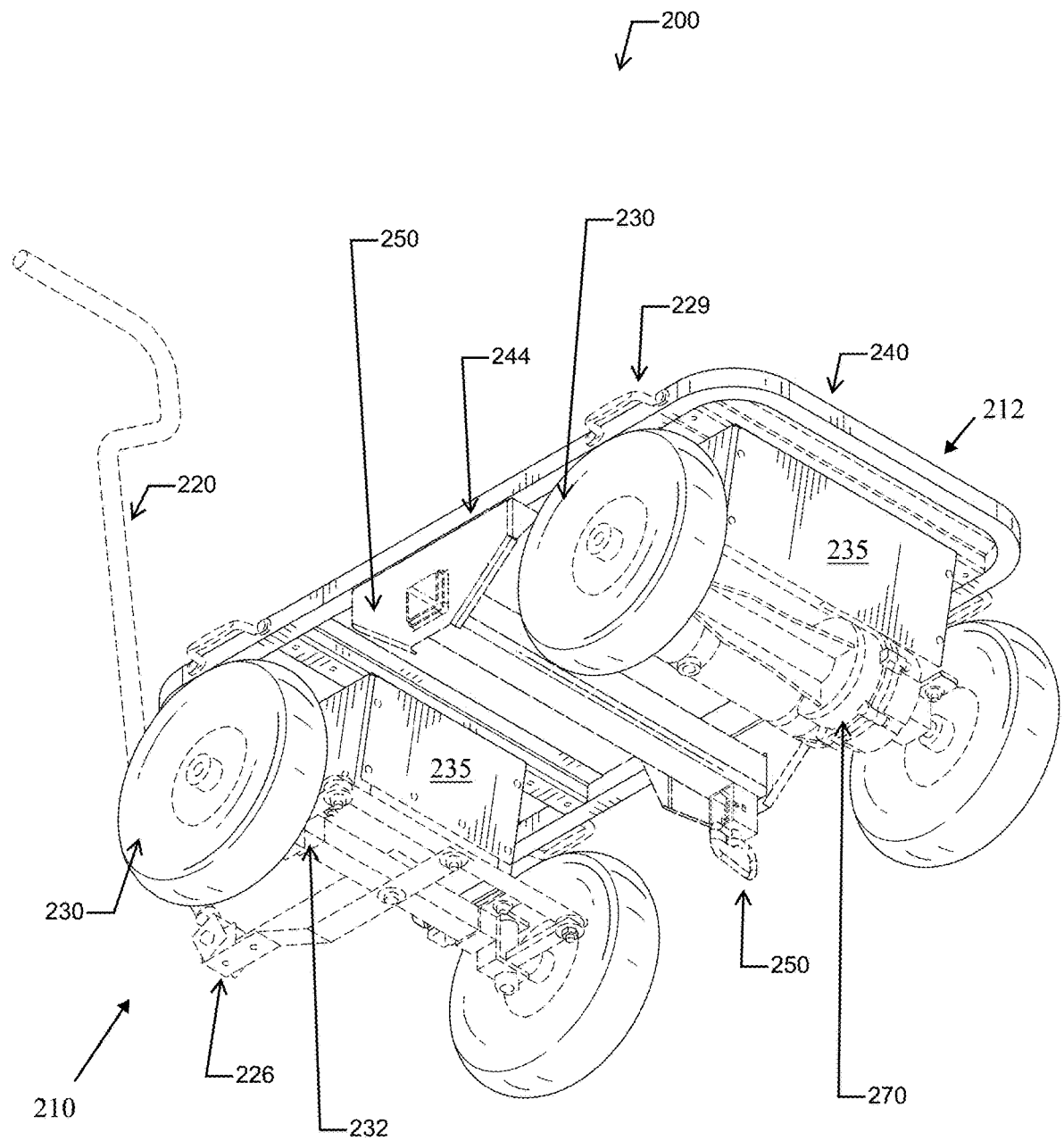
FIG. 2H illustrates an implementation of a bottom perspective view of the example frame illustrated in FIG. 2A.

A set of wheels may be coupled by an axle 232 (as illustrated in FIGS. 2G-2H). A wheel housing may cover the axle and/or portions thereof. A motor 270 may be coupled to one or more of the axles in some implementations. The wheel housing may inhibit dirt and/or other debris from coating the axle since dirt and/or debris may reduce ease of wheel movement.

The wheels may be disposed at a distance from other components such as the platform 240 of the frame using a separation module 235, in some implementations. The separation module may allow the wheeled cart to have a more compact footprint than if the axle of the wheels was directly coupled to the platform of the frame, in some implementations. The separation module may allow a platform of the frame to be disposed at a greater distance from the ground on which it resides (e.g., when compared with a cart in which the wheel axles where directly coupled to a planar frame). This greater distance may keep items being carried in the wagon cleaner and/or facilitate use (e.g., since a user may have to bend down less to reach objects in the cart).

In some implementations, the handle 220 may be coupled to set(s) of wheels, axle(s) of the wheels, and/or the other portions of the frame 200. As illustrated, in FIG. 2H, the handle may be coupled to the axle and/or a bar coupled to the frame (e.g., via the wheel assembly and/or spacer modules. Coupling the handle 220 to wheel(s) and/or axle(s) may facilitate turning and improve handling since movement of the handle (e.g., to the right and/or left) may also move the direction in which the wheels are facing relative to the first end of the frame. As illustrated in FIG. 2H, the handle 200 may be coupled to the axle 232 coupling the first set of wheels proximate the first end 210 of the frame. In some implementations, the handle 200 may be coupled to the first set of wheels and the second set of wheels, which may improve handling during movement.

The frame 200 of the wheeled cart may include a platform 240 coupled to the wheel(s) (e.g., directly or indirectly). For example, the platform may be directly coupled to the wheels via axle(s) and/or indirectly, as illustrated in FIGS. 2A-2H, via separation module(s) 235. The platform may have any appropriate size and/or shape. As illustrated in FIGS. 2A-2H, the platform 240 may be approximately rectangular. The platform 240 may have rounded corners 241. Rounded corners 241 may increase safety and/or reduce damage due to sharp edges to object(s), the surrounding area(s) through which the cart may be moved, and/or user(s). The platform 240 may have lateral supports 242 and one or more longitudinal supports 244. As illustrated, the longitudinal support 244 may extend along a perimeter of the platform 240. In some implementations, the platform may be similar to a grid and more than one longitudinal and more than one lateral support may extend across a length of the frame. Ends of lateral supports 242 may be coupled to the longitudinal support, in some implementations. The frame may include at least two lateral supports and at least one longitudinal support (e.g., an annular ring longitudinal support). The frame, in some implementations, may include at least two longitudinal supports and at least two lateral supports. The number of lateral supports may be selected to provide a pre-determined load capability.

In some implementations, the lateral supports 242 may include fastener openings 248. The fastener openings 248 may receive one or more fasteners 249 to couple one or more top members and/or objects to the frame.

The platform 240 may include open regions 246. The open regions may reduce the overall weight of the wheeled cart. The open regions may reduce the overall weight of the wheeled cart while providing a predetermined load capability and/or without substantially reducing a load capability of the wheeled cart. The open regions may extend along a width of the frame and between lateral supports and/or longitudinal supports. The open regions may be utilized to couple objects and/or top members to the frame. For example, a hook (e.g., C-shaped, S-shaped) may extend at least partially around a lateral support to couple an object and/or top member to the platform and thus the frame of the wheeled cart. As another non-limiting example, strapping (e.g., webbing, cabling, cording, chains, etc.) may be wrapped at least partially around one or more lateral supports to couple an object and/or top member to the frame.

The platform 240 may be approximately planar and/or disposed such that the platform remains approximately parallel to a ground on which it is positioned. In some implementations, the platform may be coupled to the wheels via shock absorbing components (e.g., shock absorbers, springs, foam, etc.) to maintain a disposition of the platform while the wheeled cart travels over uneven floors.

The platform may include one or more other types of handles, such as platform handles 229. The platform handles 229 may extend from longitudinal supports 244, as illustrated (e.g., in approximately the same plane and the body of the platform), and/or lateral supports 242 of the platform 240. The handles may include one or more handle aperture to facilitate gripping the platform handle and/or to ease coupling. The handles may be utilized to facilitate carrying the cart (e.g., lifting the cart for attachment to the hinge), moving the cart (e.g., when a user is positioned on a side of the cart), anchoring the cart, and/or to facilitate coupling objects to the cart. For example, strapping (not shown) can be disposed through the handle aperture and around a portion of the handle to couple with coupling member such as a strap connector clip. As another nonlimiting example, the strapping may include a coupling member (e.g., clip, hook, etc.) that is configured to engage with the platform handle. Thus, object(s) can be placed on the platform or the top member of the wheeled cart and strapping can be disposed at least partially around the object(s) to retain the object(s) in the cart. The strapping may couple with platform handles to secure and/or further secure the object(s) to the wheeled cart.

Figure 3A:
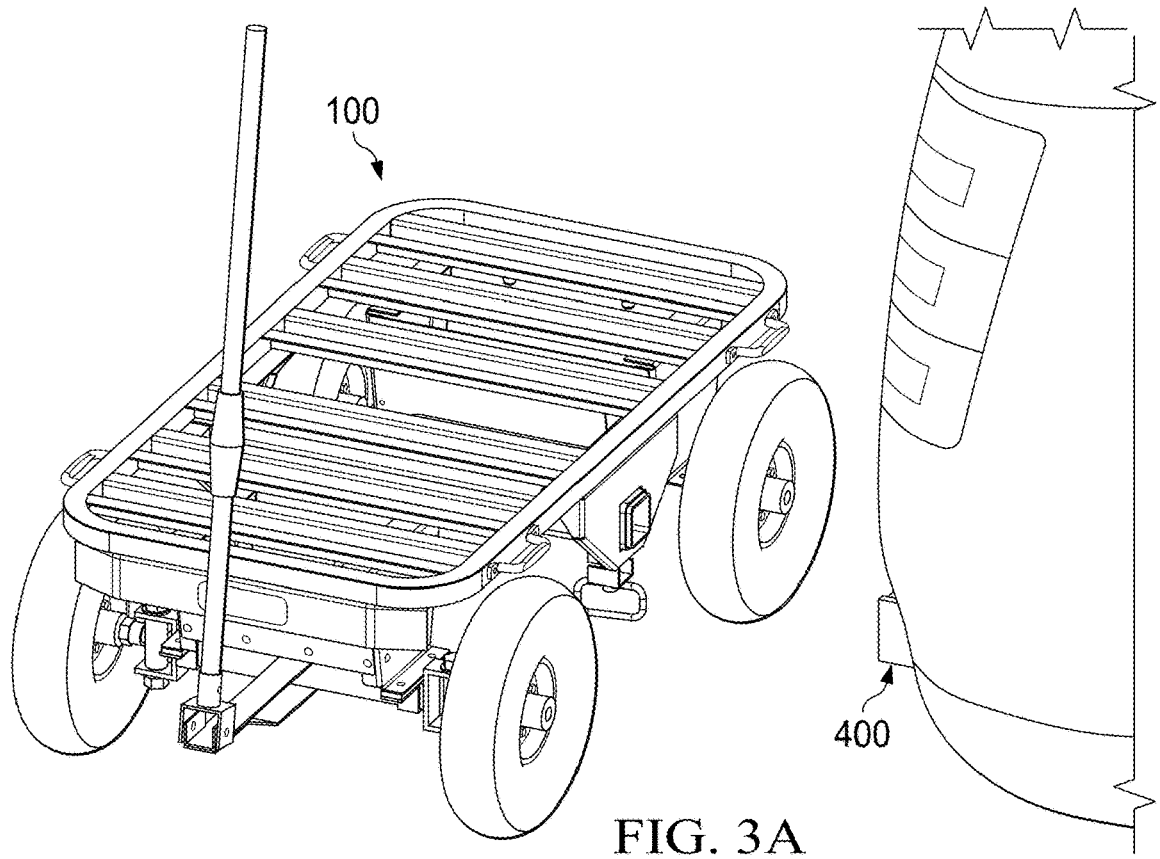
FIG. 3A illustrates an implementation of an example hitch of a wheeled cart for attachment to a vehicle via an example vehicle hitch.
Figure 3B:
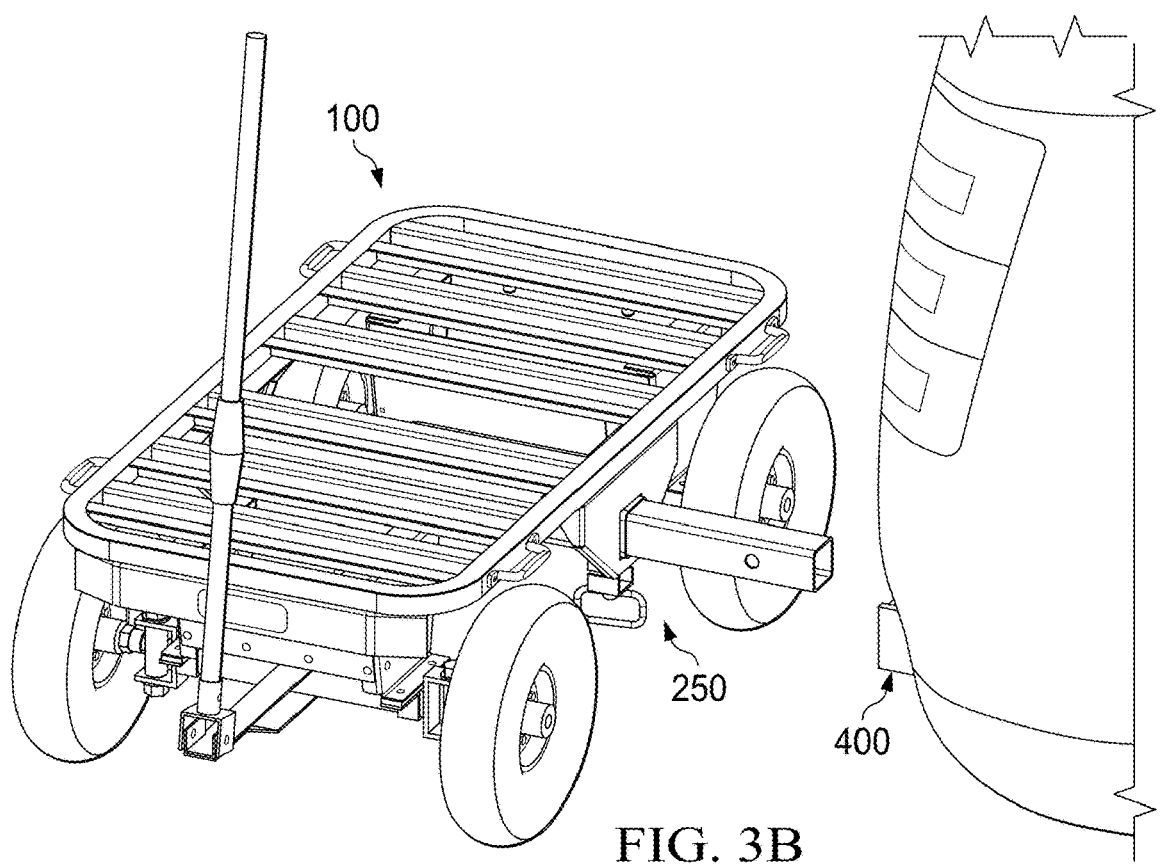
FIG. 3B illustrates an implementation of the example wheeled cart, illustrated in FIG. 3A, in which the hitch is extended.
Figure 3C:
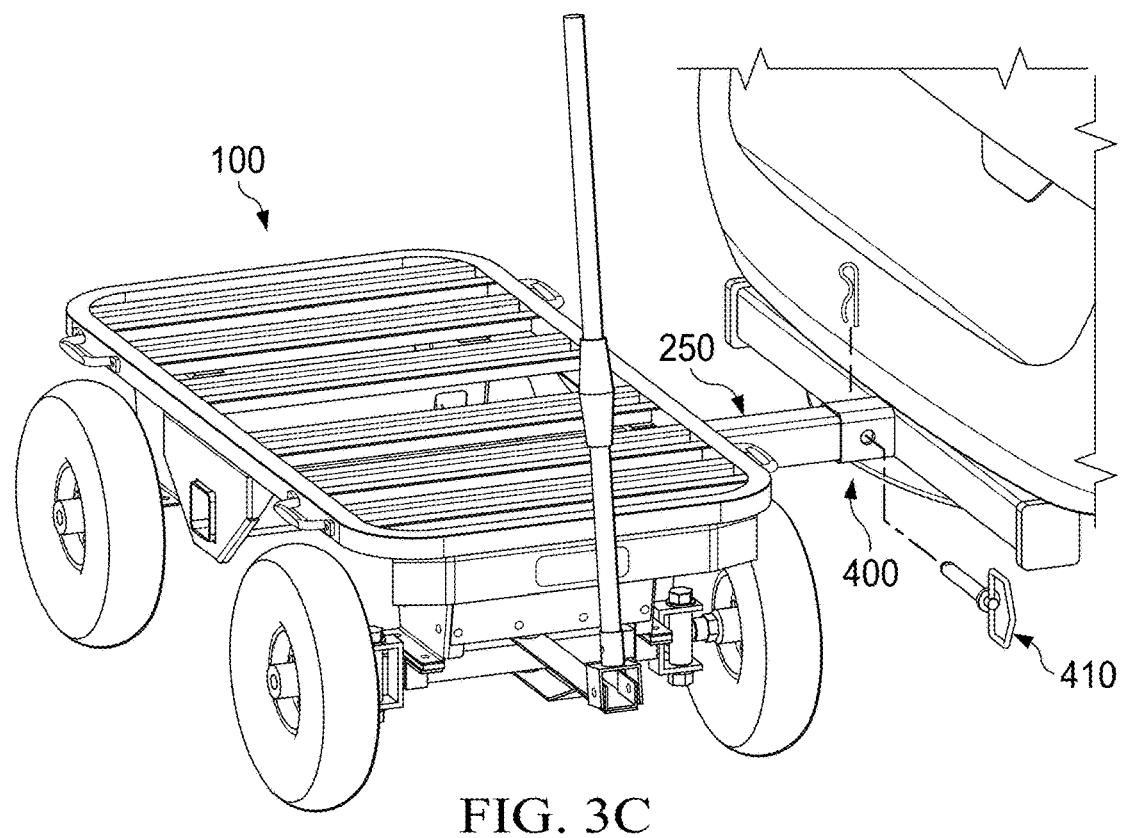
FIG. 3C illustrates an implementation of the example wheeled cart, illustrated in FIG. 3A, in which a portion of the hitch is inserted into the vehicle hitch.
Figure 3D:
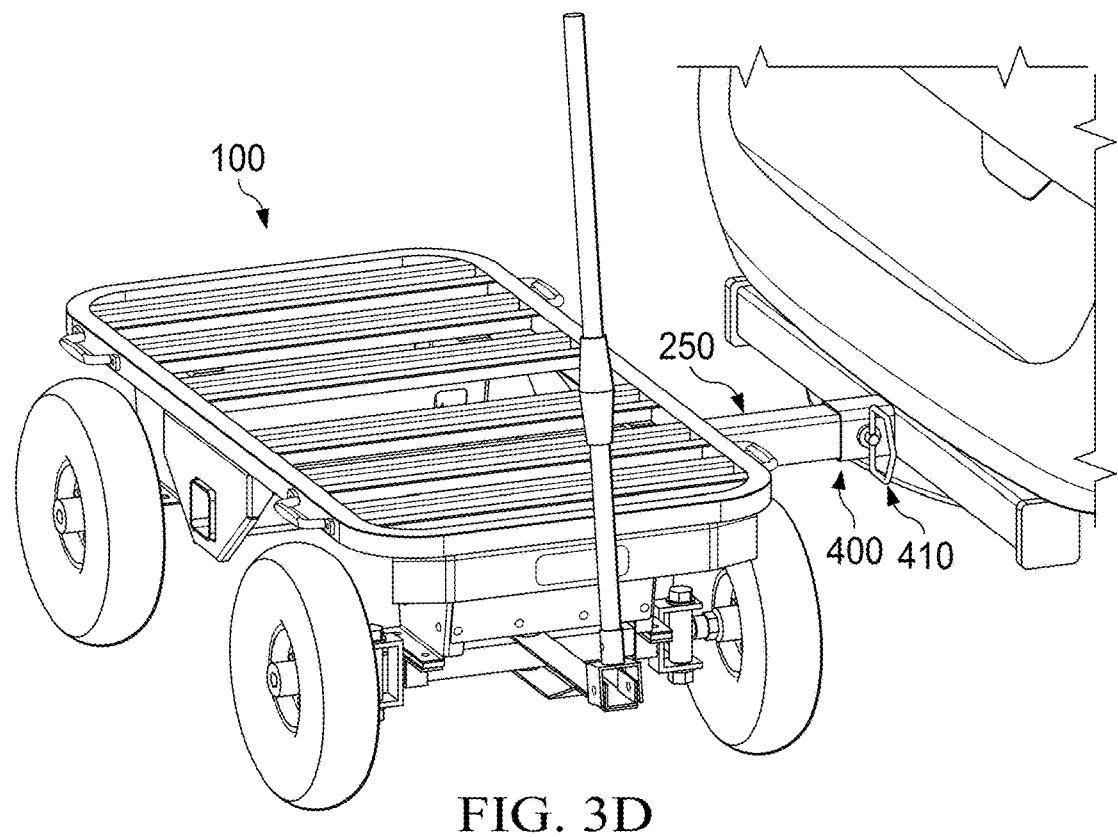
FIG. 3D illustrates an implementation of the example wheeled cart, illustrated in FIG. 3A, attached to a vehicle via an example vehicle hitch.

The frame 200 of the wheeled cart may include a hitch 250. The hitch may be capable of coupling with a vehicle hitch. Allowing a cart to couple with a vehicle hitch may facilitate transport of the wheeled cart over long distances and/or for convenience of the user. FIGS. 3A-3D, illustrate a hitch of a wheeled cart 100 coupling with a vehicle hitch 400. The hitch may be extendable from a first position to a second extended position. In the first position, the hitch may not substantially extend from a first side 213 and a second side 214 of the frame. As illustrated in FIG. 3A, when the hitch is in the first position, a first side of the hitch may not extend on the first side 213 beyond the longitudinal supports of the platform and/or the wheels. As illustrated in FIG. 3B-D, when the hitch is in second position(s), the first side of the hitch may extend beyond the longitudinal supports of the platform and the wheels. The second side of the hitch may not extend beyond the longitudinal members and/or the wheels when the hitch is in the first position or the second extended position, as illustrated in FIG. 3C. Utilizing a hitch that is extendable may allow wheels, the platform, and/or top members of the cart to not contact the vehicle (e.g., to reduce the risk of scratching or otherwise damaging the vehicle during transport of the cart by the vehicle). Utilizing a hitch that is extendable may increase safety during use of the cart since the hitch may be disposed in first position and may not extend beyond the wheels of the cart (e.g., reducing trip hazards, reducing chances for the hitch to scratch a user, the environment, and/or objects being loaded into and/or unloaded from the cart, etc).

The hitch may, in some implementations, be a telescoping hitch. FIGS. 3A-3D and 4A-4F illustrate a telescoping hitch of a frame of a wheeled cart. As illustrated, the hitch 250 may include a first member 252 and a second member 255. The first member 252 may have a first end and a second opposing end. A first end of the first member 252 may be disposed proximate the first side 213 of the frame and the second end of the first member may be disposed proximate the second side 214 of the frame. A lumen 253 may extend along at least a portion of the length of the first member 252. The first member may include one or more fastener openings. As illustrated, a first opening of the first member 252 may be disposed proximate a first end of the first member and/or a first side 213 of the frame. The second member 255 may have a first end and a second end. The second member 255 or portions thereof may have a size and/or shape such that it is received at least partially disposable in the lumen 253 of the first member 252. The second member may slide at least partially in and at least partially out of the lumen of the first member. The length of the part of the second member disposed in the lumen of the first member may be greater than the length of the part of the second member that is not disposed in the lumen of the first member, when the hitch is in the first position. A portion of the second member may extend beyond the first member to facilitate gripping the second member to extend the second member to the second position. In some implementations, the first end of the second member may include a flange and/or a grip to facilitate gripping the second member to extend and/or retract the second member. The second member 255 may include one or more fastener openings. The second member may include a second opening proximate the first end of the second member, and a third opening proximate the first end of the second member. In some implementations, the second opening and the third opening may be disposed through different sides of the second member. The second end may be capable of coupling with a vehicle hitch. For example, as illustrated in FIGS. 3C-D and 4D-F, the second member 255 of the hitch 250 may be disposed at least partially in a vehicle hitch 400. A fastener 410 may couple the vehicle hitch and the second member of the hitch as illustrated (e.g., the fastener may be a pin and/or a pin and spring assembly in which the pin is at least partially withdrawn to allow the second member of the hitch to be disposed in the cavity of the vehicle hitch and inserted into a third opening 246 in the second member and in an fastener opening in the vehicle hitch to couple the hitch and the vehicle together).

Figure 4B:
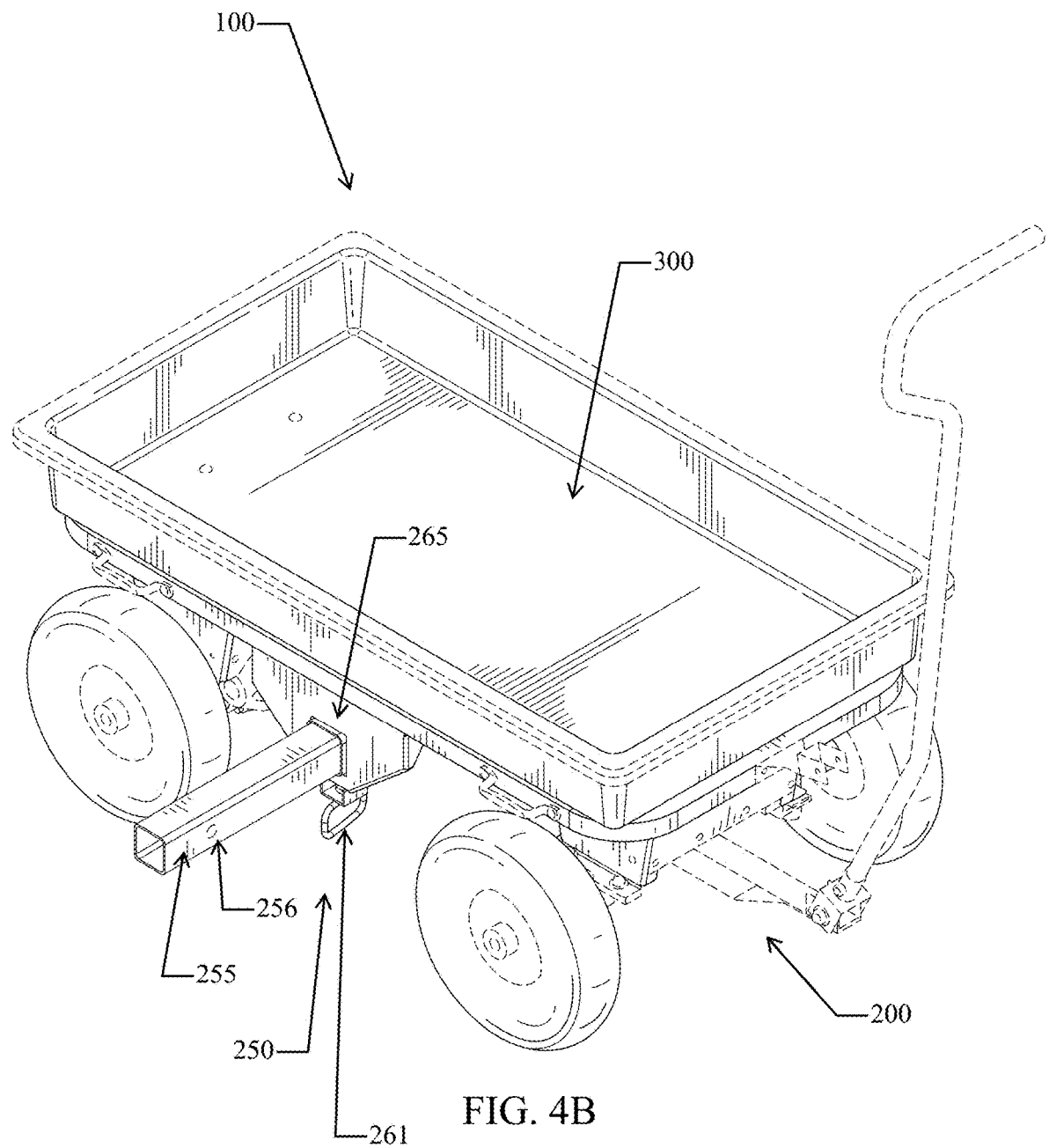
FIG. 4B illustrates an implementation of a top perspective view of the example wheeled cart illustrated in FIG. 4A in which the hitch is in the second position (e.g., extended).
Figure 4C:
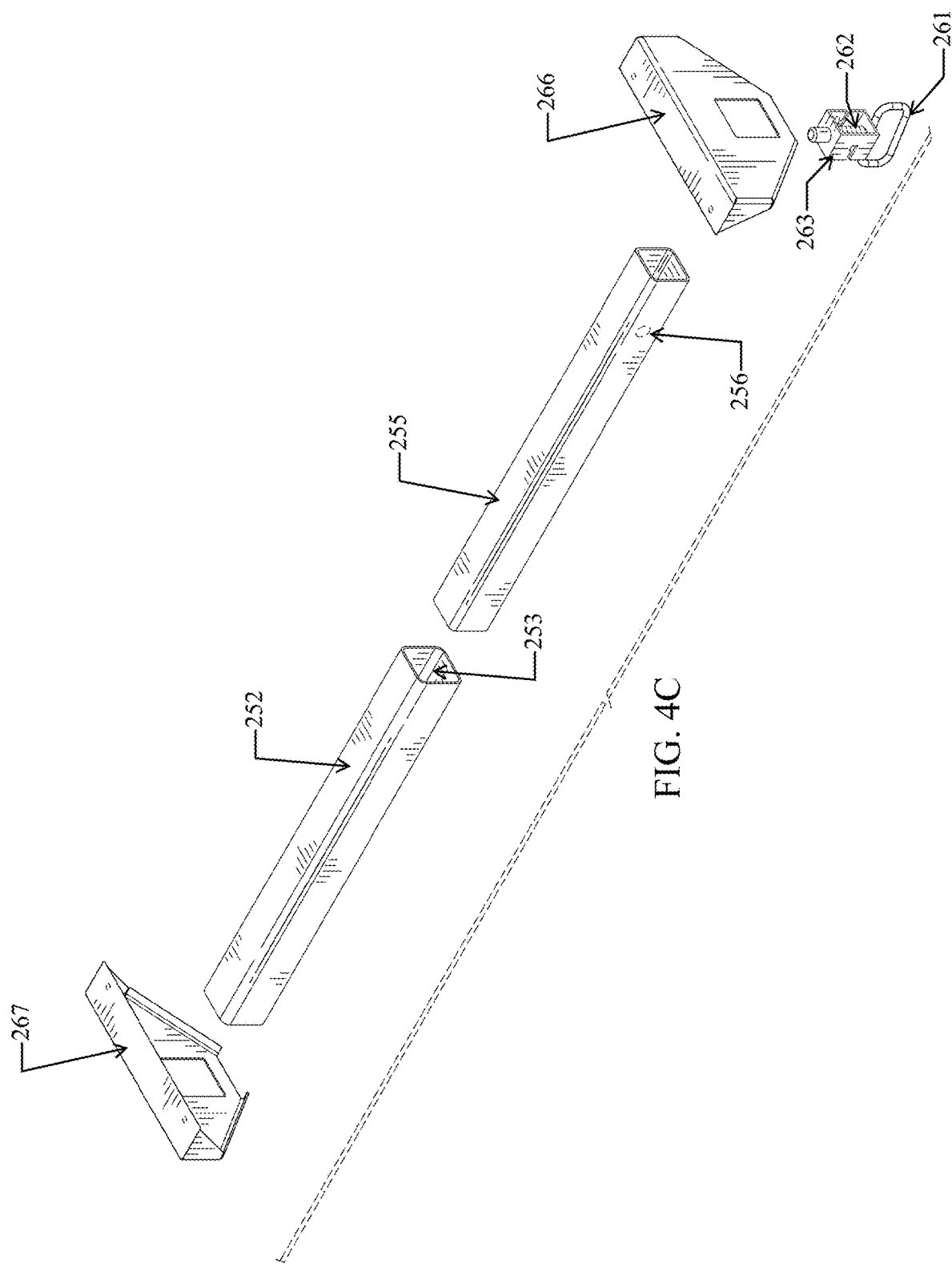
FIG. 4C illustrates an implementation of an exploded view of the example hitch illustrated in FIG. 4A.
Figure 4D:
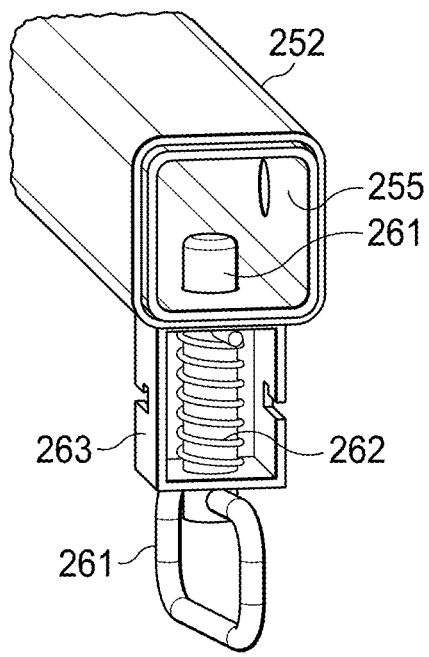
FIG. 4D illustrates an implementation of the example hitch illustrated in FIG. 4C in which the hitch is in the first position.
Figure 4E:
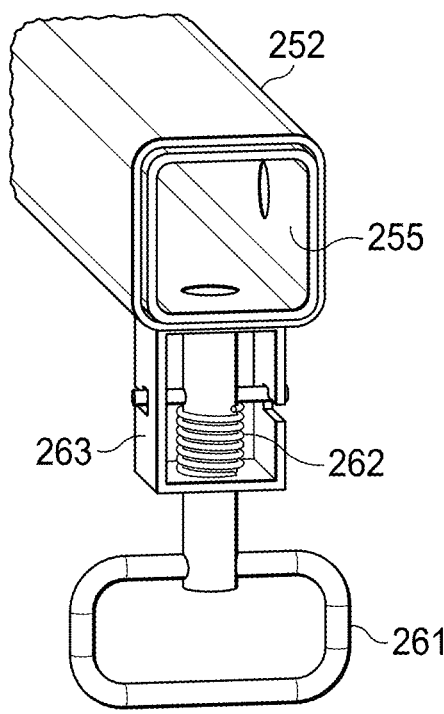
FIG. 4E illustrates an implementation of the example hitch illustrated in FIG. 4C in which the hitch is in the first position.
Figure 4F:
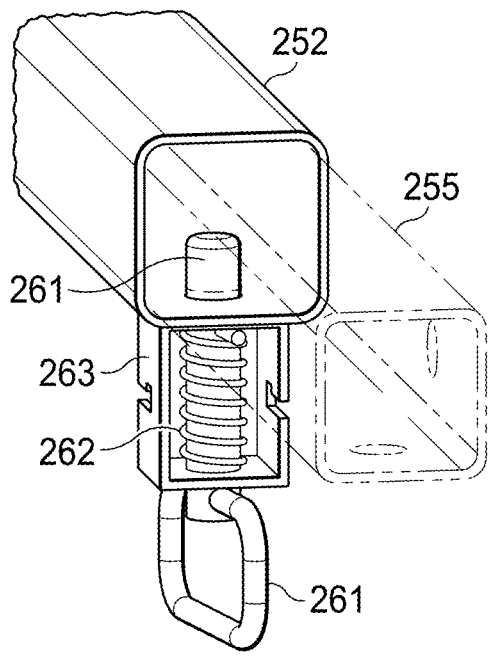
FIG. 4F illustrates an implementation of the example hitch illustrated in FIG. 4C in which the hitch is in the second position.

A locking member 260 of the hitch 250 may couple the first member 252 and the second member 255 together. As illustrated, the locking member may be disposed proximate a first side 213 of the frame. The locking may include a pin and/or a pin and spring assembly. As illustrated in FIGS. 4A-4F, a pin 261 may have a grip and a shaft. The pin may be disposed below the first and the second members, as illustrated in FIG. 4A, or may be disposed on a side of the first and second members, such that the pin is parallel to the platform of the frame. Spring 262 may wrap around at least a portion of the pin 261 (e.g., at least a portion of the shaft). The spring 262 may be disposed in a lock 263, through which the pin is disposed. The lock 263 may allow the spring to be compressed and/or allowed to extend while remaining coupled to the pin, in some implementations. The pin 261 of the locking member may be disposed through the first opening of the first member. FIG. 4D illustrates an implementation of the hitch in the first position. In the first position, the pin is disposed through a first opening in the first member and a second opening in the second member. A portion of the pin may reside inside the second member when the hitch is in the first (retracted) position. As illustrated in FIG. 4D-4E, when the hitch and/or second member is in the first position, the second member is retracted into the lumen 253 of the first member 252 and the pin is disposed in the second opening of the second member to retain the second member and/or the hitch in the first position. To extend the hitch from the first position to the second position, as illustrated in FIGS. 4E-4F, the pin 261 is pulled such that the spring 262 is compressed and the shaft of the pin is drawn farther out of the lumen of the first member 252 and out of the second opening of the second member 255. This allows the second member 255 to be pulled to extend from a side of the frame. As illustrated in FIG. 4F, once the second member 255 is extended to a desired position (e.g., a second position to, for example, hitch the cart to a vehicle), the pin 261 may be released and the spring 262 about the pin may be allowed to extend. The pin 261, when the hitch is in the second position, may extend through the first opening of the first member and may extend through a fourth opening in the second end of the second member. The pin may maintain the coupling between the first member and the second member. In some implementations, the pin 261, when the hitch is in the second position, may extend through the first opening of the first member and may not extend into the second member. The second member may be retained in the first member due to a stop of the first and/or second member, protrusion and/or recess, frictional fit, and/or any other appropriate means.

In some implementations, the first member 252 of the hitch 250 may be directly coupled to the platform 240. In some implementations, the first member 252 of the hitch 250 may be coupled to the platform 240 via a bracket assembly 265. The bracket assembly include a single set of brackets that extend along at least a portion of the width of the frame and between the first set of wheels and the second set of wheels. As illustrated in FIG. 4C, the bracket assembly may include a first bracket 266 coupled to a longitudinal member proximate a first side 213 of the frame 240 and a second bracket 267 coupled to a longitudinal member on the second side 214 of the frame. The first bracket 266 and the second bracket 267 may include orifices to receive at least a portion of the first member and couple the first member to the bracket assembly, and thus the frame. The first member may be fixedly coupled to the bracket assembly and the second member may be slidably coupled to the first member.

Figure 5A:
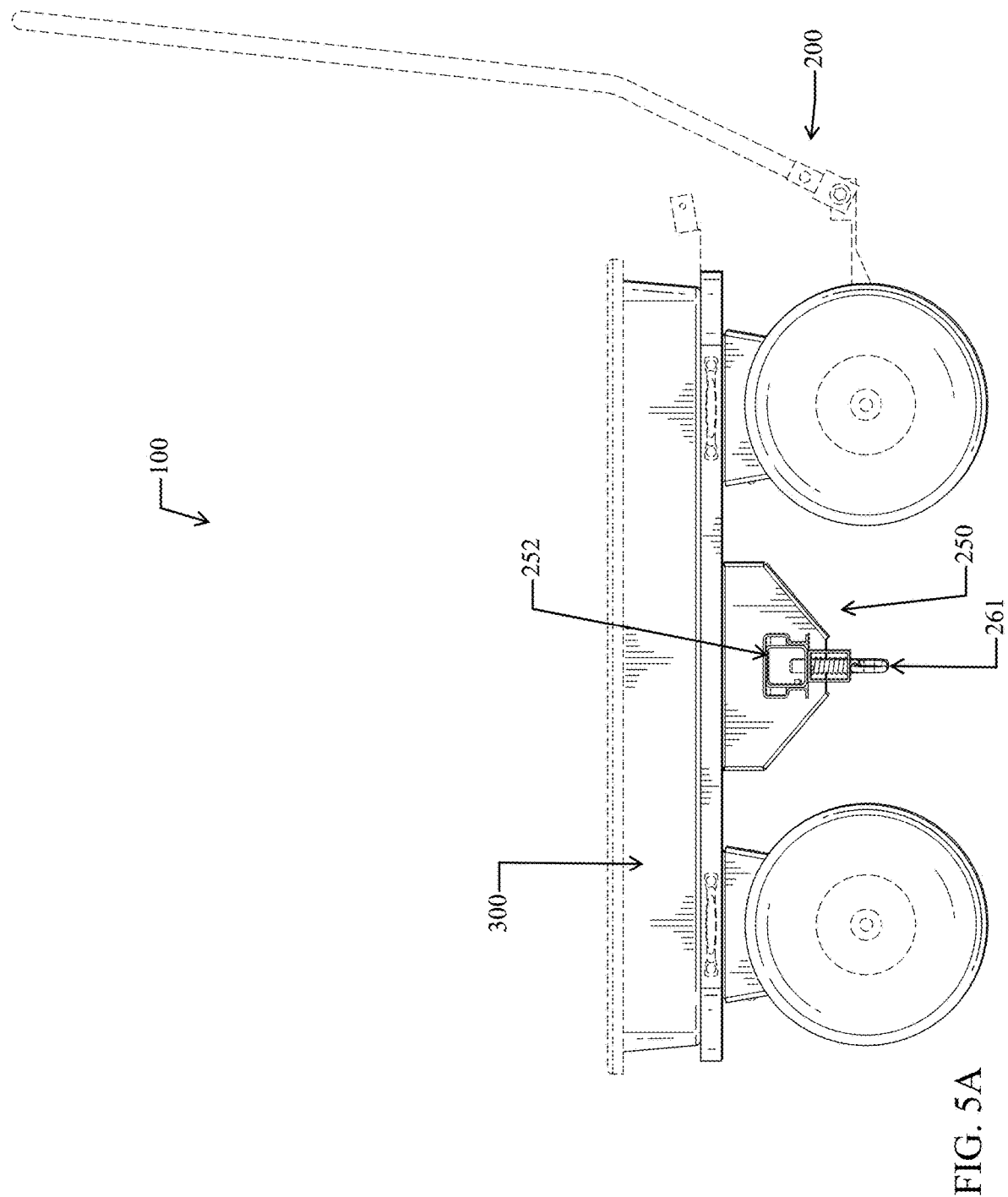
FIG. 5A illustrates an implementation of a side view of an example wheeled cart with a telescoping hitch.
Figure 5B:
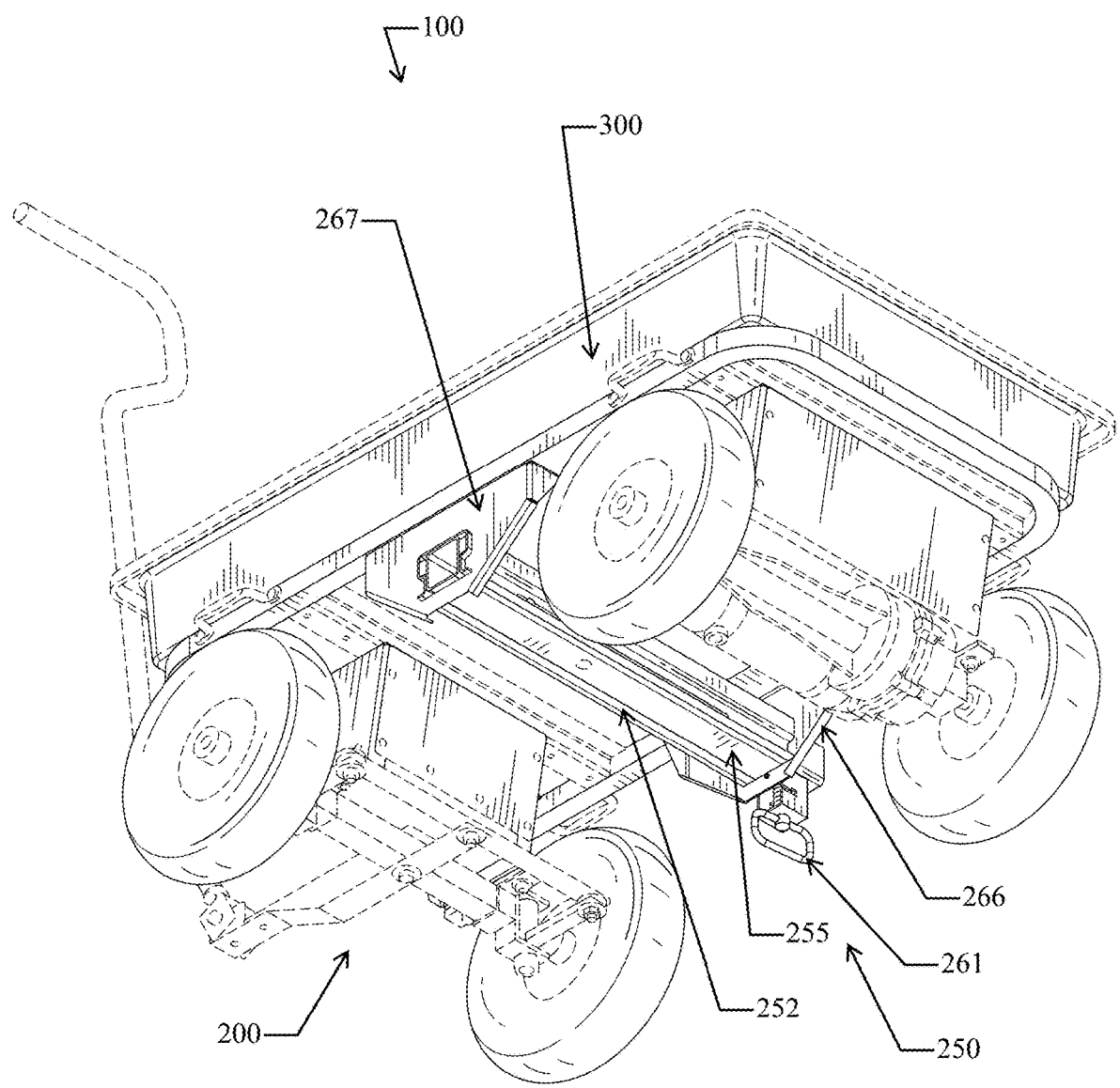
FIG. 5B illustrates an implementation of a side view of the example wheeled cart illustrated in FIG. 5A in which the example telescoping hitch is disposed in the first position (e.g., unextended or retracted).
Figure 5C:
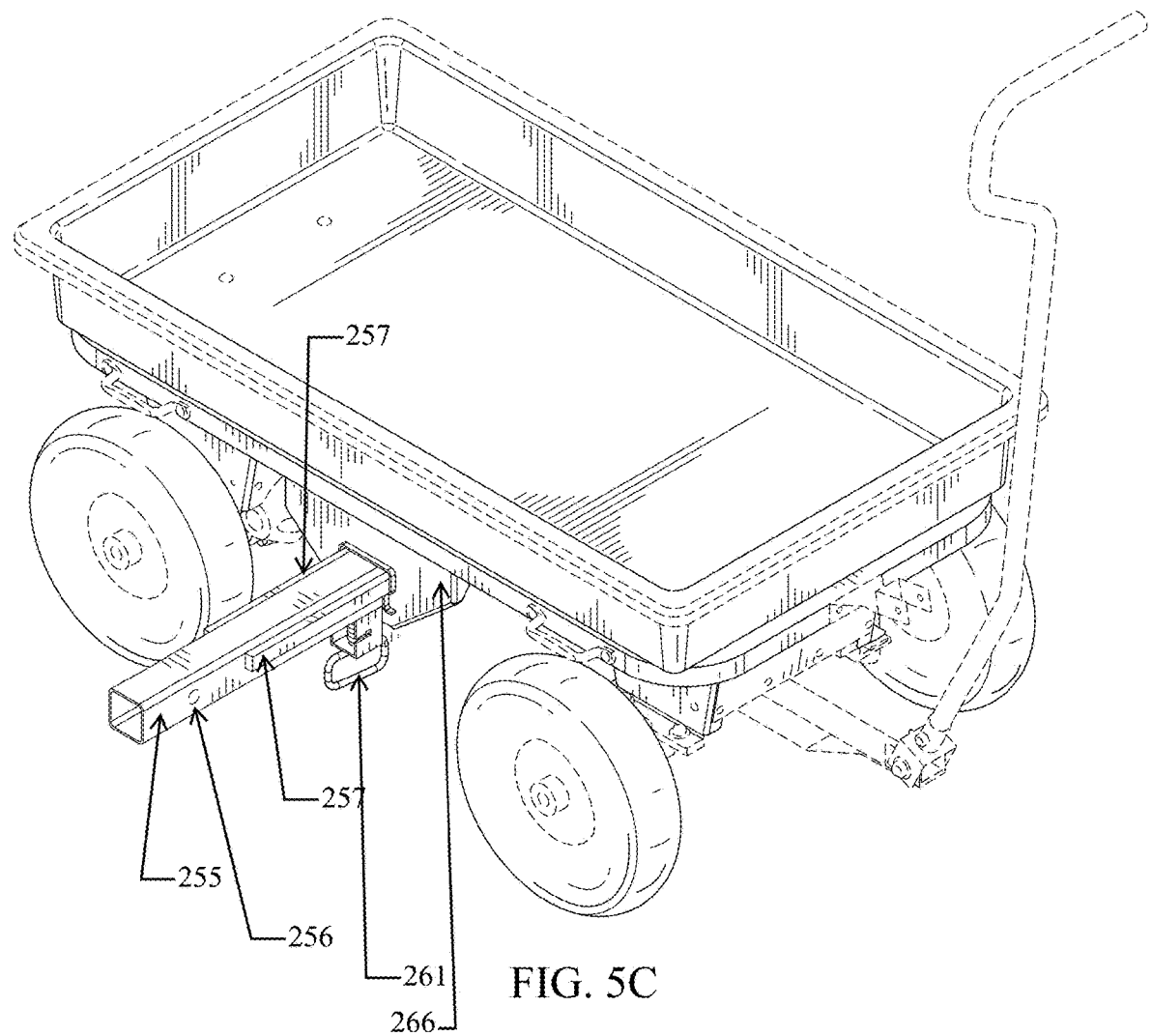
FIG. 5C illustrates an implementation of a side view of the example wheeled cart illustrated in FIG. 5A in which the example telescoping hitch is disposed in the second position (e.g., extended).
Figure 5D:
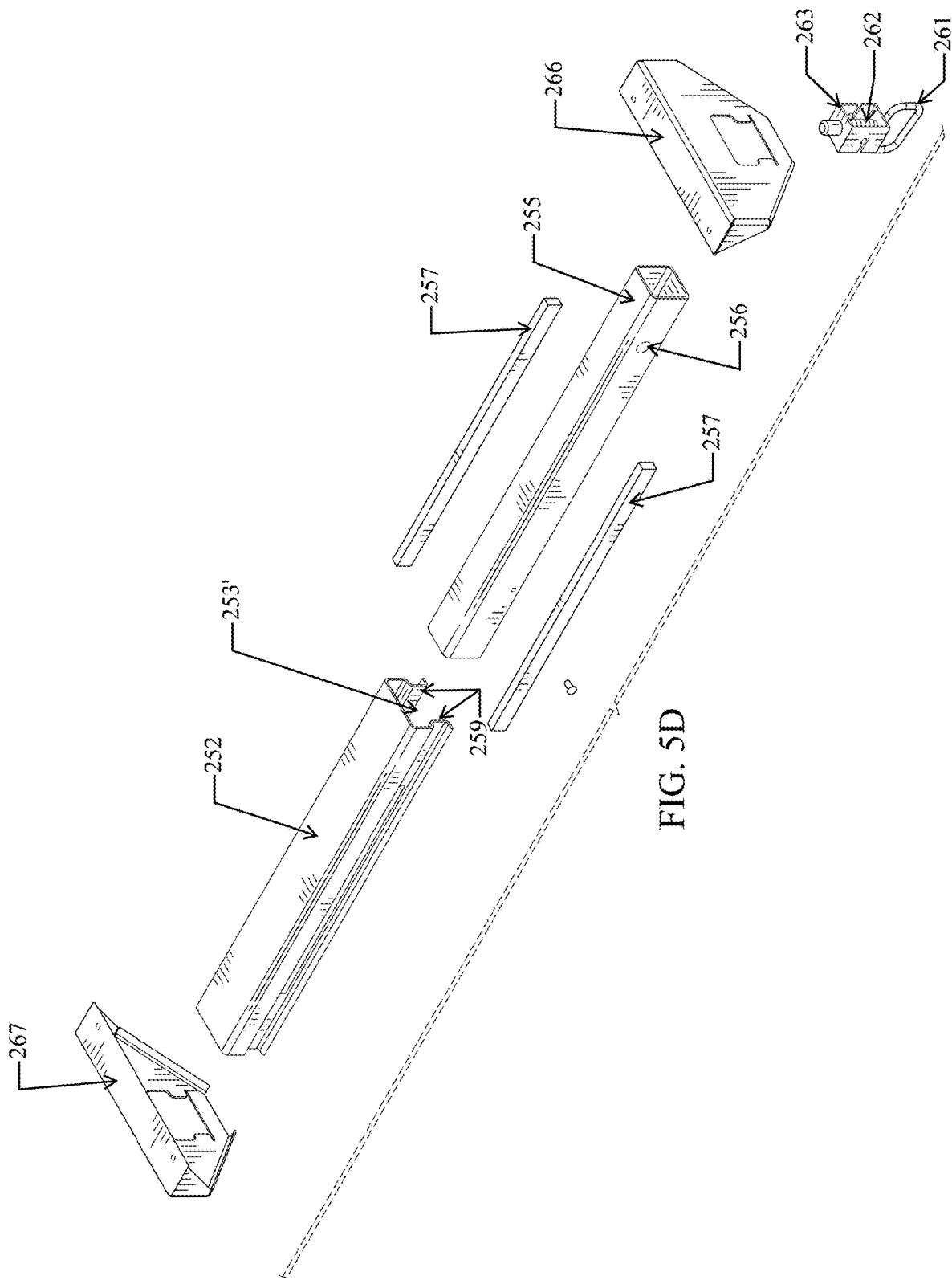
FIG. 5D illustrates an implementation of an exploded view of the example hitch illustrated in FIG. 5A.

In some implementations, other types of extendable hitches may be utilized with the described wheeled cart 100. FIG. 5A-5D illustrate an implementation of a telescoping hitch. FIG. 5B illustrates the hitch 250 in a first position and FIG. 5C illustrates the hitch in the second extended position. As illustrated, the hitch 250 is extendable from the first position to the second position. The hitch 250 may include a first member 252 and a second member 255. The first member 252 may have a first end and a second opposing end. A first end of the first member 252 may be disposed proximate the first side 213 of the frame and the second end of the first member may be disposed proximate the second side 214 of the frame. The first member may have a C-shaped cross-section and a length. A channel 253' may extend along at least a portion of the length of the first member 252. The channel may include an inner open region between the walls of the first member 252 and may be open on one side. In some implementations, the channel may be a closed channel. The channel 253' may be configured to receive at least a portion of the second member 255. The channel 253' may have a retaining feature that allows the second member to be retained in the first member. As illustrated, the C-shaped member may have one or more protrusions 259 (e.g., extending from the wall(s) of the first member and/or formed of the wall of the first member). The protrusions 259 may narrow the open portion of the C-shaped cross-section such that the second member is at least partially retained in the first member. The protrusions may extend along at least a portion of the length of the first member. The first member may include one or more fastener openings. As illustrated, a first opening of the first member 252 may be disposed proximate a first end of the first member and/or a first side 213 of the frame. The second member 255 may have a first end and a second end. The second member 255 or portions thereof may have a size and/or shape such that it is received at least partially disposable in the channel 253' of the first member 252. As illustrated, the second member 255 may include one or more protrusions 257 that are received in the channel 253' of the first member 252. The protrusions may be formed in the second member and/or be fastened to the second member via fasteners. The second member may slide at least partially in and at least partially out of the lumen of the first member. In some implementations, the protrusions 257 of the second member may act as rails along which the second member slides in the first member. The second member 255 may include one or more fastener openings. The second member may include a second opening and/or a third opening proximate the first end of the second member. The second end may be capable of coupling with a vehicle hitch in a similar manner as described in FIGS. 3C-D. The telescoping hitch described in FIG. 5A-5D may include a similar locking member as the hitch described and illustrated in FIGS. 4A-C. The hitch may include a bracket assembly similar to the bracket assembly described and illustrated in FIGS. 5A-5D.

Figure 6A:
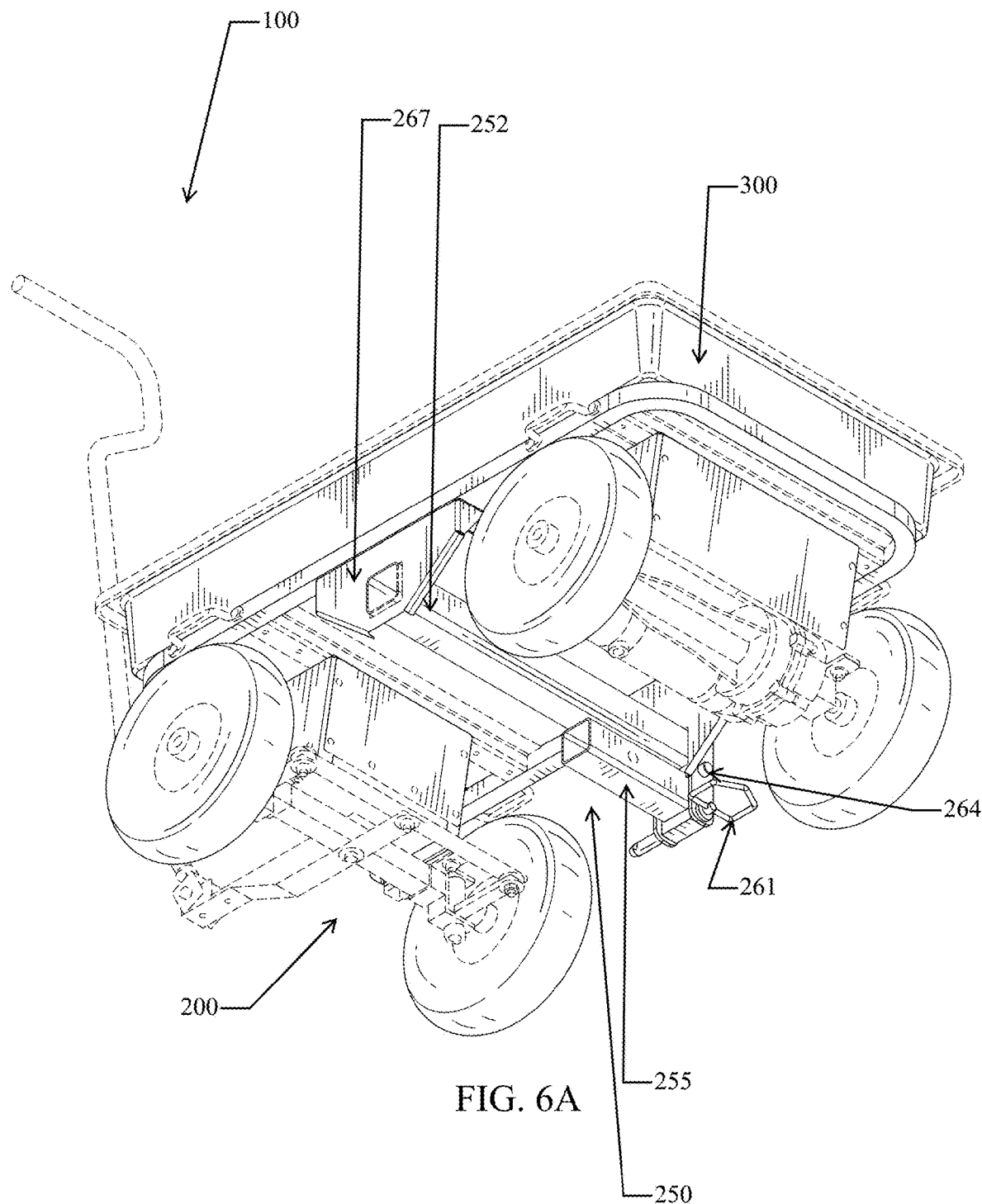
FIG. 6A illustrates an implementation of a side view of an example wheeled cart with a swing out hitch in the first position (e.g., unextended).
Figure 6B:
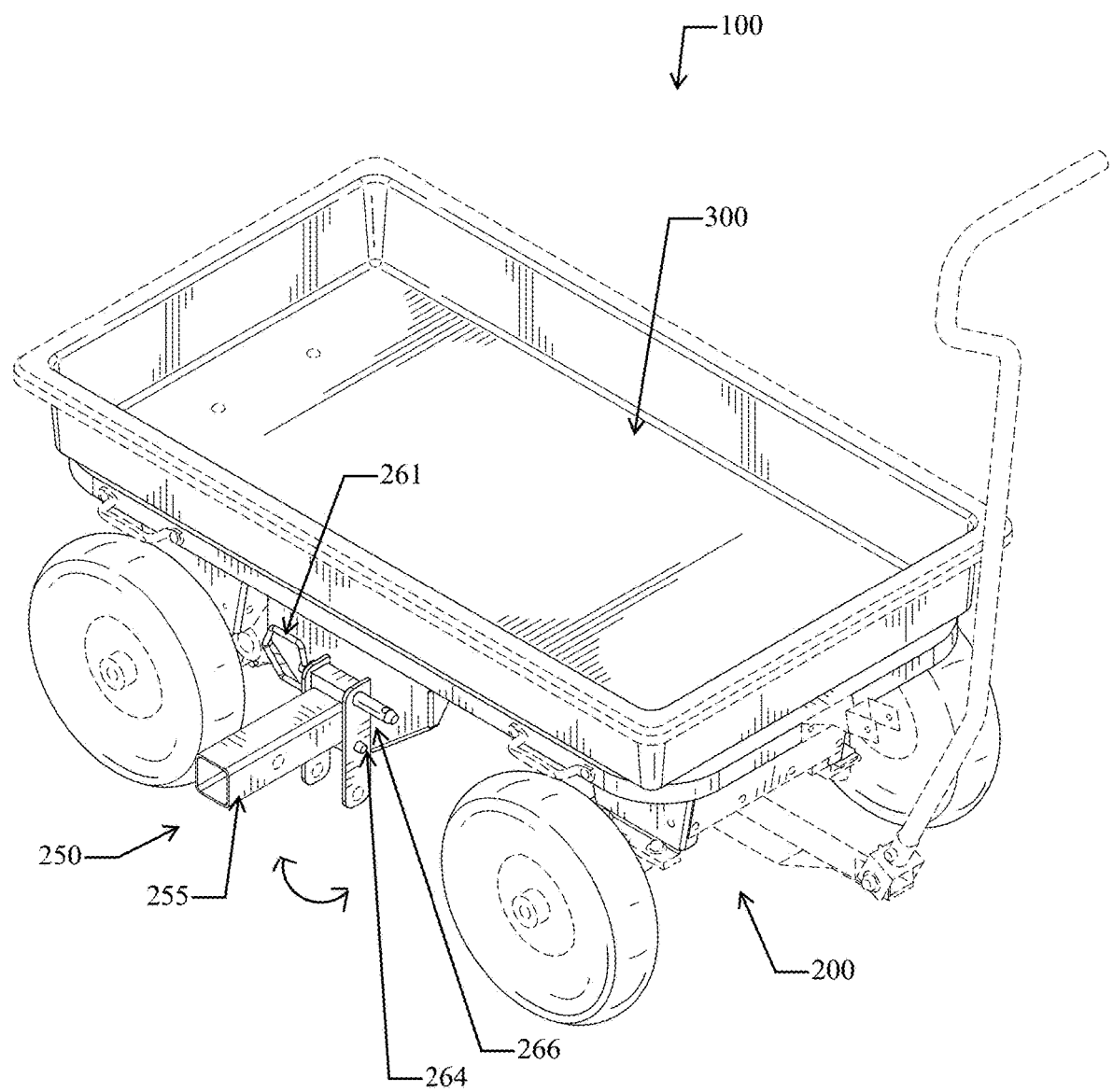
FIG. 6B illustrates an implementation of a top perspective view of the example wheeled cart illustrated in FIG. 6A in which the hitch is in the second position (e.g., extended).
Figure 6C:
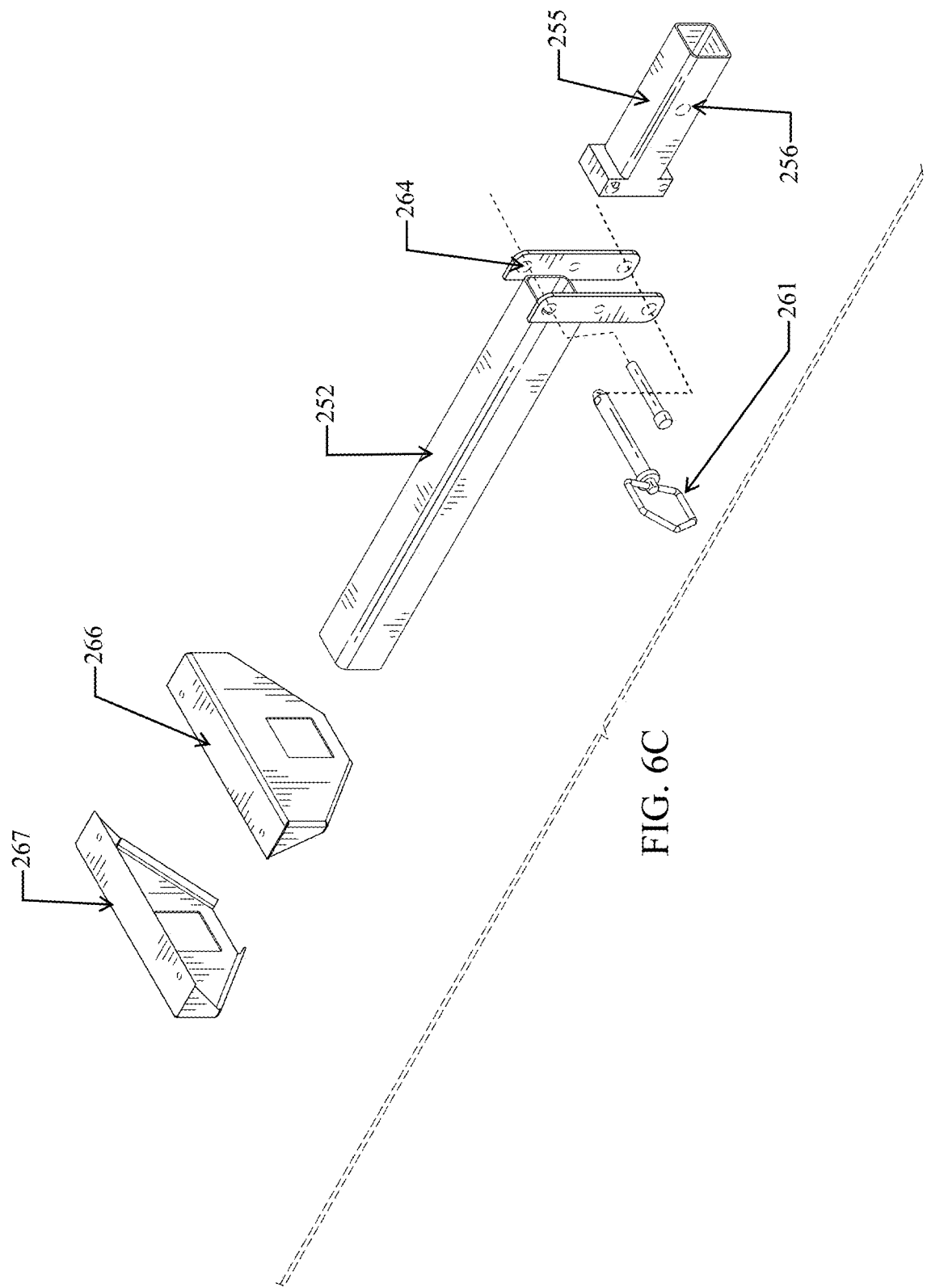
FIG. 6C illustrates an implementation of an exploded view of the example hitch illustrated in FIG. 6A.

In some implementations, a swing out hitch may be utilized with the wheeled cart. FIGS. 6A-6C illustrate a swing out hitch 250. FIG. 6A illustrates the hitch 250 in a first position and FIG. 6B illustrates the hitch in the second extended position. As illustrated, the hitch 250 is extendable from the first position to the second position. The hitch 250 may include a first member 252 and a second member 255. The first member 252 may have a first end and a second opposing end. A first end of the first member 252 may be disposed proximate the first side 213 of the frame and the second end of the first member may be disposed proximate the second side 214 of the frame. The first member may or may not have a lumen 253 or a channel 253'. The first end of the first member 252 may be coupled to the locking member 260. The locking member may include a hinge 264. The hinge 264 may be coupled to the second member and allow the second member to rotate about the hinge between the first position and the second position of the second member and thus, the hitch. The hinge 264 of the locking member 260 may include an opening in the body of the locking member and a pin that couples the body of the locking member 260 and the second member. The locking member may include a position lock 264'. The position lock 264' of the locking member may include a pin 261 and/or a pin and spring assembly similar to the pin and spring assembly described in FIGS. 5A-5D. The hinge 264 may be disposed above the position lock 264', in some implementations, to allow the second member to reside below and proximate the first member 252 (e.g., to reduce the footprint of a cart with an retracted hitch/hitch in a second position, to increase safety and inhibit the hitch from catching on other objects or the user, etc.). The second member 255 may have a first end and a second end. The second end may be capable of coupling with a vehicle hitch in a similar manner as described in FIGS. 3C-D. As illustrated, when the swing out hitch is disposed in the first position, the second member (e.g., in the direction of the length) is approximately parallel to the first member (e.g., in the direction of the length of the first member). When the swing out hitch is disposed in the second position, the second member may be in the same plan and/or in line with a length of the first member.

The wheeled cart 100 is capable of coupling with one or more top members. The top members may be components that allow the wheeled cart to be used for a specified purpose. For example, the wheeled cart may include a container top member that allows the top member to at least partially retain object(s) in the body of the container top. FIG. 1 illustrates an implementation of a container top member 310. The container top member 310 may or may not have a size and/or shape similar to the platform. The container top 310 may have a body with walls 311 that extend from a floor 312 of the container and create a space in which objects and/or fluids can be retained. The walls may be coupled at a first end to the floor 312 and at a second opposing end may or may not include a flange 313. The walls may be solid panels or panels with openings through the walls. The floor may include fastener openings 249 that are alignable with openings in the lateral supports and/or the longitudinal supports. Fasteners may be disposed through the fastener openings in the floor and/or at least partially through the fastener openings in the lateral supports, as illustrated, to couple the container top member to the frame of the wheeled cart 100.

In various implementations, a first top member may be coupled to the frame of the wheeled cart and may be removed to couple a different top member to the frame of the wheeled cart. The ability to interchange the top member of the wheeled cart may provide a modular wheeled cart that is capable of being used in more applications. This modularity may decrease carbon footprint required for work (e.g, since the wheeled cart may present a single solution for projects), may decrease waste, and/or increase user satisfaction.

Figure 7:
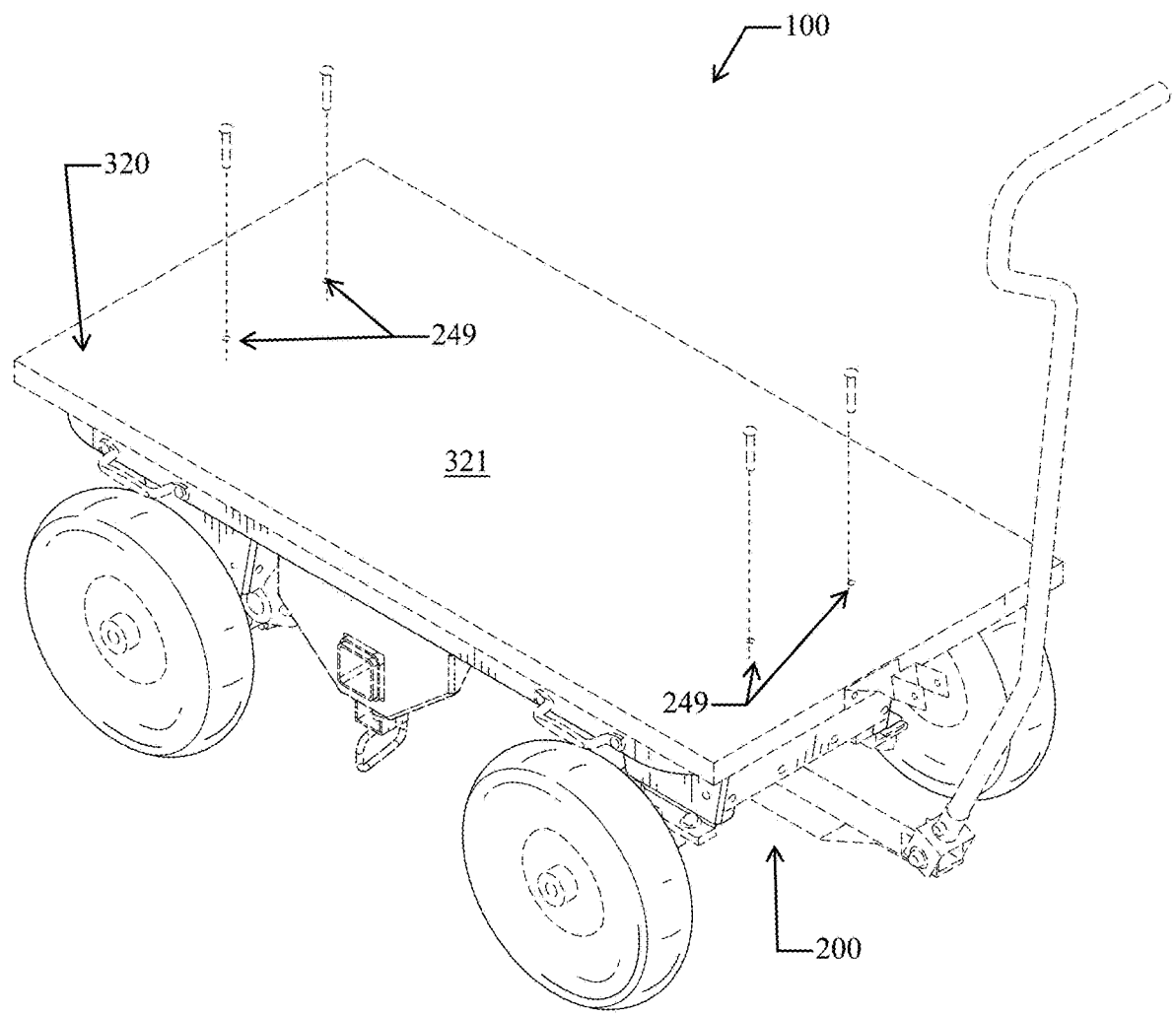
FIG. 7 illustrates an implementation of a top perspective view of the wheeled cart illustrated in FIG. 2A, with an example flatbed top member.
Figure 8:
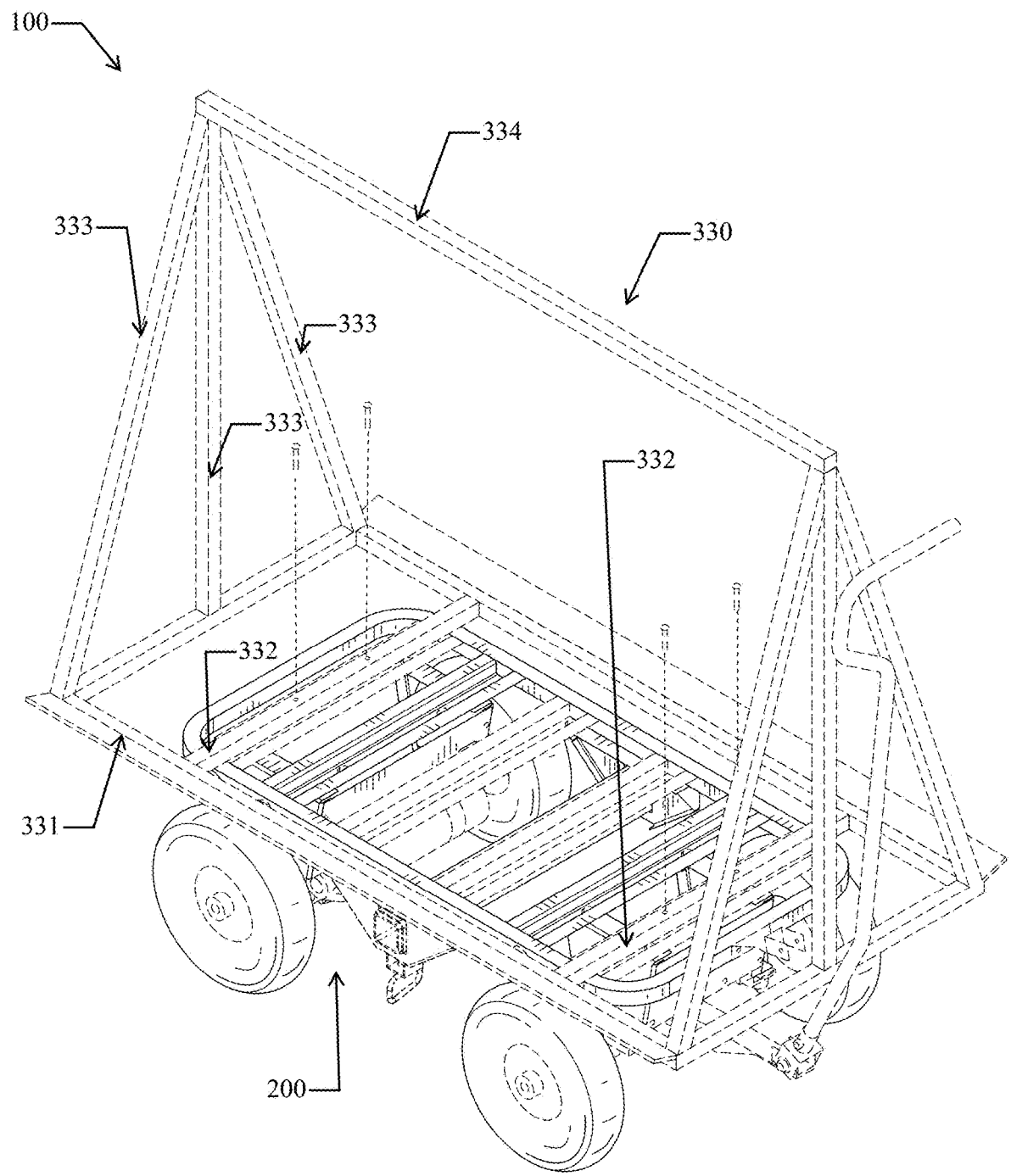
FIG. 8 illustrates an implementation of a top perspective view of the wheeled cart illustrated in FIG. 2A, with an example A-frame top member.
Figure 9:
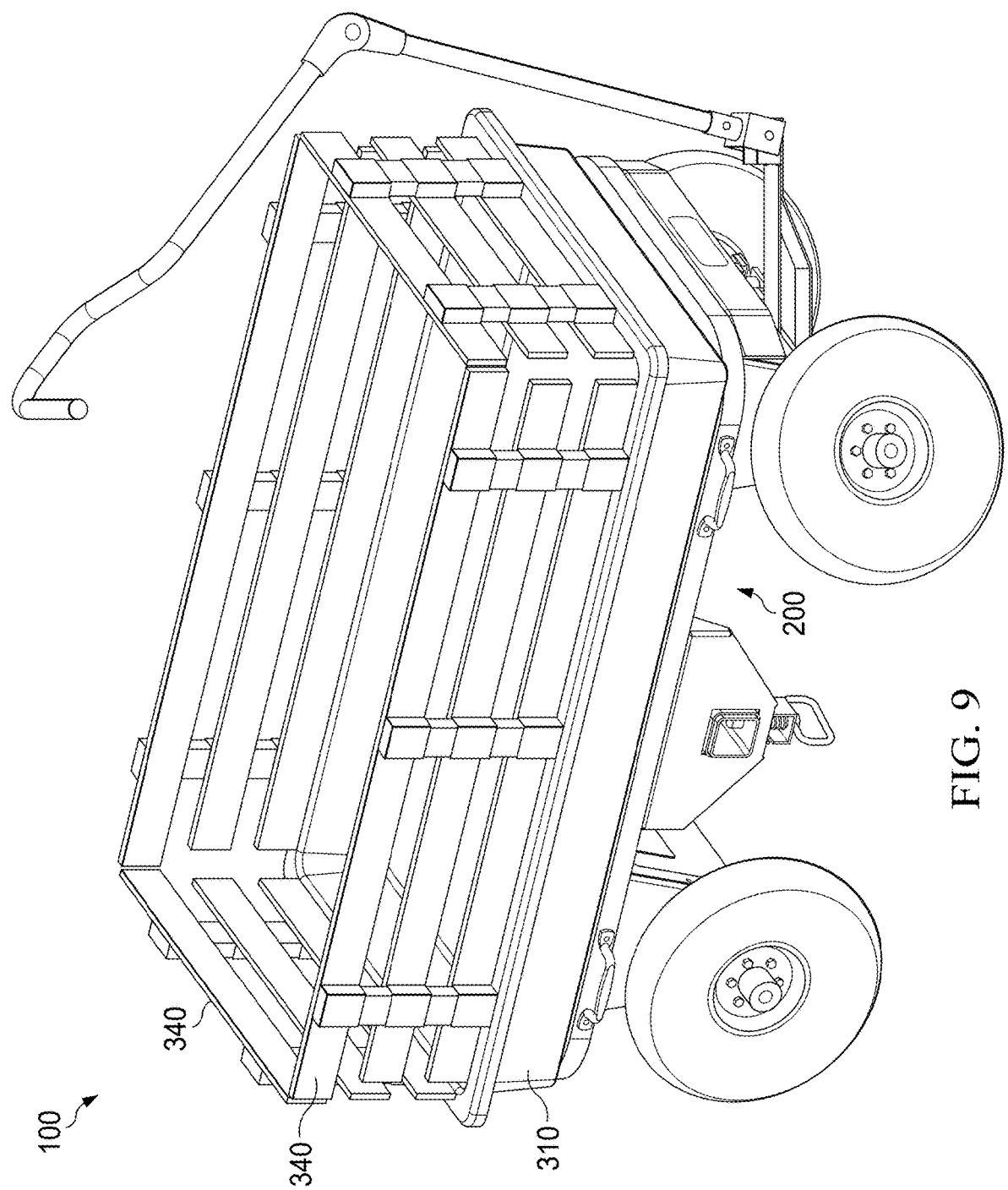
FIG. 9 illustrates an implementation of a side perspective view of the wheeled cart illustrated in FIG. 2A, with an example wall top member.

In various implementations, other top members may be utilized with and coupled to the frame of the wheeled cart. FIG. 7 illustrates an implementation of a flatbed top member 320. The flatbed top member 320 may include a floor 321 and may or may not include a flange around a perimeter of the flatbed top member. The flatbed may be a planar member that is approximately parallel to the platform of the frame. The floor 321 may include fastener openings 249 that are alignable with openings in the lateral supports and/or longitudinal supports and allow the flatbed top member to be coupled with the frame. Fasteners may be disposed through the fastener openings 249 in the floor and/or at least partially through the fastener openings in the lateral and/or longitudinal supports, as illustrated, to couple the flatbed top member to the frame of the wheeled cart 100. FIG. 8 illustrates an implementation of an A-frame top member 330. The A-frame top member may or may not include a floor. The A-frame top member 330 may include a rack system that includes one or more horizontal longitudinal bottom members 331, one or more latitudinal 332 bottom members, one or more vertical members 333 (e.g., slanted and/or normal relative to the bottom members), and one or more top member 334 that are coupled to create an A-frame. The longitudinal 331 and/or latitudinal 332 bottom members may include fastener openings 249 that are alignable with openings in the lateral supports and/or longitudinal supports of the platform. Fasteners may be disposed through the fastener openings 249 and/or at least partially through the fastener openings in the lateral and/or longitudinal supports of the platform, as illustrated, to couple the A-frame top member 330 to the frame of the wheeled cart 100. In some implementations, the top member 330 may include one or more walls coupled directly to the platform of the frame and/or another top member, such as the container top member as illustrated in FIG. 9. The walls 340 may include one or more posts 341 and one or more side panels 342. The post(s) may be received in opening(s) in the top member and/or platform. In some implementations, the posts may be L-shaped brackets in which the flange may include opening(s) that is alignable with opening(s) in the platform to couple the post and the platform (e.g., via a fastener through the openings). A side panel may include an aperture through which the post may be disposed. A post may be disposed through one or more side panels to create a wall of a predetermined height and/or of predetermined strength (e.g., use of more side panels may increase the force the formed wall can withstand without uncoupling and/or deforming). The side panel(s) and posts may thus be utilized in combination to create walls to at least partially retain objects within the wheeled cart. The walls 340 may be used to extend the height of the body of the wheeled cart. In some implementations, walls with openings disposed through the walls may facilitate securing objects in the wheeled cart, since for example, object(s) may be coupled (e.g., strapped, hooked, etc.) to the wall(s).

Figure 10A:
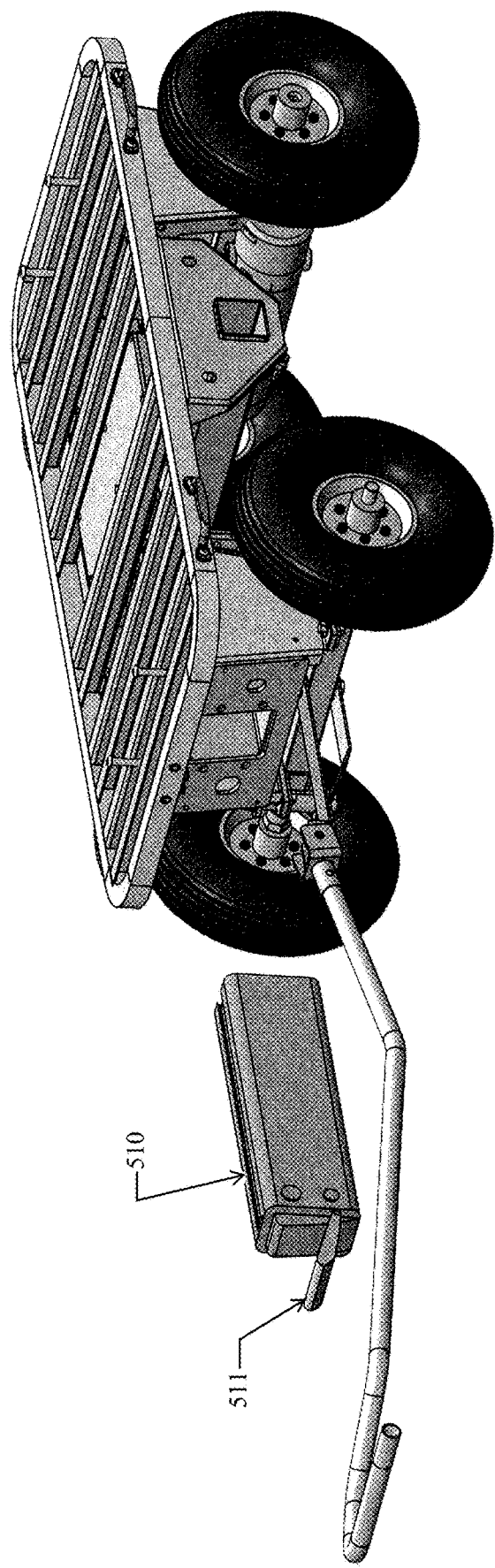
FIG. 10A illustrates an implementation of a frame of a wheeled cart with an example motor assembly.
Figure 10B:
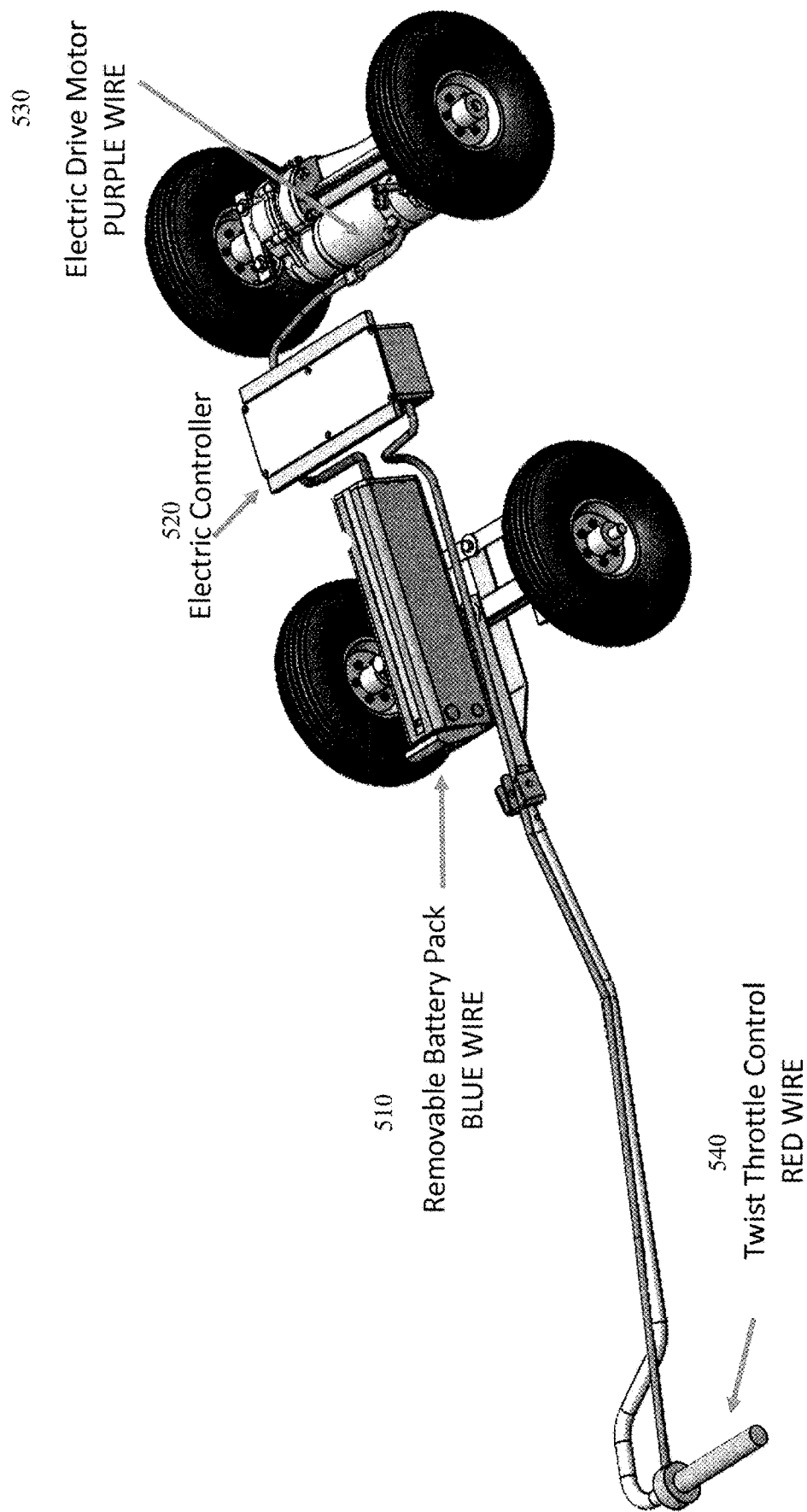
FIG. 10B illustrates an implementation of a portion of the frame and the example motor assembly illustrated in FIG. 10A.

In various implementations, the wheeled cart may include a motor assembly 500 to assist in movement of the wheeled cart and/or to move the wheeled cart. The motor assembly may include a gas and/or electric motor. The electric motor may be rechargeable (e.g., via plugging in the cart, by removing the battery and recharging it, by solar power, etc.). The motor may be coupled to the first and/or second set of wheels to rotate the wheels. FIG. 10A-B illustrate an implementation of an electric motor coupled to the set(s) of wheels of the frame. As illustrated in FIG. 10A, the frame may include a battery opening 243 in lateral supports 242 of the wheel assembly. The battery 510 may be removably positioned in the battery opening 243. The battery may be a battery similar to commercially available ebike batteries and/or may include a handle 511 to facilitate removal of the battery from the battery opening. The battery 510 may be connected to a controller 520. The controller may be coupled to a motor 530 that is coupled to the first set of wheels and/or the second set of wheels. As illustrated, the motor may be connected to the second set of wheels and not connected to the first set of wheels.

The wheeled cart may include throttle control. As illustrated in FIG. 10B, the handle 220 may include an electronic twist throttle control (e.g., with forward and reverse). In some implementations, the throttle control may be disposed on a different portion of the handle and/or may be actuated in a manner other than twisting (e.g., button, lever, etc.). Power from the battery 520 may energize the electronic controller 520 which in turn sends electrical signals to the twist throttle control 540. As the throttle control is rotated, it sends corresponding electrical signals to the electronic controller 520 which in turn supplies the electric power to the motor 530 (e.g., electric drive motor) to move and/or assist in movement of the cart.

In various implementations, although separate fastener openings are described in some implementations, in other implementations, a fastener opening may be utilized for more than one purpose. For example, a second opening of the second member may operate as the second opening and the third opening of the second member. This second opening may be capable of receiving a pin of the locking member when in the hitch is in the first position and may be capable of receiving a pin of a vehicle hitch.

Various parts of the wheeled cart may include any appropriate materials. For example, parts of the wheeled cart may be made of metals, such as steel and/or aluminum; plastics; reinforced plastics, etc. In implementations, one or more parts of the wheeled cart may include coatings, for example, to inhibit rust, increase cleanability, provide a slip resistance surface, to facilitate gripping (e.g., of handles), etc.

Although distinct hitches have been described, a described hitch of the wheeled cart may include one or more features of another implementation of the hitch. For example, the telescoping hitch illustrated in FIG. 4A may include features of the telescoping hitch of FIG. 5A and/or features of the swing out hitch of FIG. 6A. As another example, the swing out hitch of FIG. 6A may include features of the telescoping hitch 4A and/or 5A.

Although a specific battery, motor, and/or controller configuration has been described, implementations may include other configurations and/or versions of the battery, motor, and/or controller.

Various components such as the platform, components of the hitch, and/or top member, may have any appropriate size and/or shape. The hitch may be capable of coupling with an industry standard vehicle hitch.

In various implementations, protrusions and/or recesses are described as portions of components of the wheeled cart (e.g., in the hitch, etc.). Although protrusions and corresponding recesses are described as coupled to parts, the parts to which they are coupled may be switched. Thus, a described protrusion on first component that mates with a recess of a second component may instead include a recess on a first component that mates with a protrusion of a second component.

In various implementations, described process(es) may be implemented by various described system(s), such as cart 100. In addition, various described operation(s) may be added, deleted, and/or modified in implementations of the described process(es) and/or system(s). In some implementations, a described process or operations thereof may be performed in combination with other described process(es) or operations thereof.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a hitch" includes a combination of two or more components and reference to "wheel" includes different types and/or combinations of wheels. As another example, references to "coupling" between two or more parts of the wagon/wagon assembly include direct and indirect coupling between the two or more parts.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A modular wheeled cart comprising:
a frame, wherein the frame comprises:
a first end;
a second end disposed opposite the first end;
a width;
a length between the first end and the second end;
a handle coupled to the frame, wherein the handle comprises:
a shaft; and
a grip;
wherein a portion of the shaft of the handle is rotatable about a shaft hinge;
at least four wheels coupled to the frame, wherein the at least four wheels comprises:
a first set of wheels disposed proximate the first end of the frame; and
a second set of wheels disposed proximate the second end of the frame;
a platform coupled to the at least four wheels, wherein the platform comprises:
lateral supports that include fastener openings;
at least one longitudinal support coupling the lateral supports together; and
open regions between lateral supports;
one or more platform handles coupled to the at least one longitudinal support; and
a telescoping hitch, coupled to at least two of the lateral supports, disposed between the first set of wheels and the second set of wheels, and transversely spanning the width of the frame from a first side to a second side, and wherein the telescoping hitch is configured to extend perpendicularly from the first side between a first position and at least one second position; and
wherein the telescoping hitch comprises:
a first member coupled to the platform, wherein the first member comprises:
a lumen; and
a first opening;
a second member disposable at least partially in a lumen of the first member, wherein the second member comprises a second opening; and
a locking member, wherein the locking member comprises:
a pin, wherein the pin is disposed through the first opening of the first member of the telescoping hitch and into the lumen of the first member; and
a spring disposed about at least a portion of the pin, and wherein the spring is disposed between an end of the pin and the first opening such that a force is applied to the pin to withdrawn the pin from at least one of the first opening and or second opening and when the force is released the spring causes the pin to extend further into the lumen of the first member;
wherein to position the telescoping hitch in one of the second positions, the pin is withdrawn from the second opening in the second member to allow the second member to extend away from the frame; and wherein when the telescoping hitch is retracted to dispose the telescoping hitch in the first position, the pin is disposed in the first opening of the first member and the second opening of the second member of the telescoping hitch; and wherein the second member of the telescoping hitch is capable of coupling with a vehicle hitch; and
two or more modular top components removably coupled to the platform via the fastener openings in the lateral supports, wherein the two or more modular top components comprises at least an A-frame and a second modular top component.

2. The modular wheeled cart of claim 1 further comprising an electric motor assembly coupled to the frame and configured to drive two or more of the at least four wheels.

3. The modular wheeled cart of claim 2 wherein the frame further comprises a battery channel configured to receive a removable battery such that when the removable battery is inserted into the channel it is capable of coupling with the motor assembly to provide power to the motor assembly.

4. The modular wheeled cart of claim 2 wherein the handle comprises a lock configured to allow the shaft of the handle to be retained in the first position.

5. The modular wheeled cart of claim 1 wherein the one or more modular top components is coupled to one or more of the lateral members of the frame via fasteners.

6. The modular wheeled cart of claim 1 wherein the frame further comprises:
a bracket assembly, wherein the bracket assembly comprises a first bracket at a first end of the bracket assembly and a second bracket at a second end of the bracket assembly, wherein the first bracket and the second bracket are coupled to one or more of the lateral members of the frame, and wherein the first bracket comprises a first aperture through which the first member of the telescoping hitch is disposed; and wherein the first member is coupled to the second bracket.

7. The modular wheeled cart of claim 6 wherein the second bracket further comprises a second aperture through which the first member is coupled.

8. The modular wheeled cart of claim 1 wherein the frame comprises four or more platform handles disposed on the one or more lateral members, and wherein at least two of the handles are disposed on opposing sides of the frame relative to each other.

9. The modular wheeled cart of claim 1 wherein the grip of the handle is C shaped.

10. A modular wheeled cart comprising:
a frame, wherein the frame comprises:
   a first end;
   a second end disposed opposite the first end;
   a width;
   a length between the first end and the second end;
   a handle coupled to the frame, wherein the handle comprises:
      a shaft; and
      a grip;
      wherein a portion of the shaft of the handle is rotatable about a shaft hinge;
at least four wheels coupled to the frame, wherein the at least four wheels comprises:
   a first set of wheels disposed proximate the first end of the frame; and
   a second set of wheels disposed proximate the second end of the frame;
a platform coupled to the at least four wheels, wherein the platform comprises:
   lateral supports that include fastener openings;
   at least one longitudinal support coupling the lateral supports together; and
   open regions between lateral supports; and
a swing hitch coupled to at least two of the lateral supports of the platform, wherein the swing hitch is disposed between the first set of wheels and the second set of wheels, and transversely spanning the width of the frame from a first side to a second side;
and wherein the swing hitch comprises:
   a bracket assembly, wherein the bracket assembly is coupled to the platform, and wherein the bracket assembly comprises a first end and a second end;
   a first member coupled at a first end to the first end of the bracket assembly and coupled at a second end to the second end of the bracket assembly;
   a second member disposed proximate the first end of the bracket assembly and coupled to the first member via a locking member, wherein the second member comprises:
      a first end disposed proximate the first end of the first member; and
      a second end capable of coupling with a vehicle hitch; and
   the locking member, wherein the locking member comprises:
      a hinge about which the second member rotates;
      a pin and spring assembly, wherein the pin and spring assembly can release the second member disposed in a first position to allow the second member to rotate to a second position, wherein when the second member is in the second position the second member extends outward from the frame and the first member, and wherein the second member is approximately parallel to the first member when the second member is in the second position; and
two or more modular top components removably coupled to the platform via the fastener openings in the lateral supports, wherein the two or more modular top components comprises at least an A-frame and a second modular top component.

11. The modular wheeled cart of claim 10 further comprising an electric motor assembly coupled to the frame and configured to drive two or more of the at least four wheels.

12. The modular wheeled cart of claim 11 wherein the frame further comprises:
a battery channel configured to receive a removable battery such that when the removable battery is inserted into the channel it is capable of coupling with the motor assembly to provide power to the motor assembly; and
an electronic twist throttle coupled to the handle, wherein the electronic twist throttle is coupled to an electronic controller of the electronic motor assembly, wherein the electronic controller controls a speed of an electronic motor of the electronic motor assembly.

13. The modular wheeled cart of claim 10 wherein the handle comprises a lock configured to allow the shaft of the handle to be retained in the first position.

14. The modular wheeled cart of claim 10 where the frame comprises separation members that allows a first axle coupling the first set of wheels and the second axle coupling the second set of wheels to be disposed at a distance from the platform.

15. A modular wheeled cart comprising:
a frame, wherein the frame comprises:
   a first end;
   a second end disposed opposite the first end;
   a width;
   a length between the first end and the second end;
   a handle coupled to the frame, wherein the handle comprises:
      a shaft; and
      a grip;
      wherein a portion of the shaft of the handle is rotatable about a shaft hinge;
at least four wheels coupled to the frame, wherein the at least four wheels comprises:
   a first set of wheels disposed proximate the first end of the frame; and
   a second set of wheels disposed proximate the second end of the frame;
a platform coupled to the at least four wheels, wherein the platform comprises:
   lateral supports that include fastener openings;
   at least one longitudinal support coupling the lateral supports together; and
   open regions between lateral supports; and
a telescoping hitch, coupled to at least two of the lateral supports, disposed between the first set of wheels and the second set of wheels, and transversely spanning the width of the frame from a first side to a second side, and
   wherein the telescoping hitch is configured to extend perpendicularly from the first side between a first position and at least one second position; and
   wherein the telescoping hitch comprises:
      a first member coupled to the platform, wherein the first member comprises:
         a C-shaped cross-section, a length perpendicular to the c-shaped cross-section;
a channel in between walls of the C-shaped cross-section;
a first interior recess extending along at least a portion of a length of the first member; and
a second interior recess extending along at least a portion of the length of a second member;
a first opening;
the second member disposable at least partially in the channel of the first member, wherein the second member comprises:
a first protrusion capable of being at least partially received in the first interior recess of the first member, wherein the first protrusion extends along at least a portion of a length of the second member;
a second protrusion capable of being at least partially received in the second interior recess of the first member, wherein the second protrusion extends along at least a portion of the length of the second member;
a second opening; and
a locking member, wherein the locking member comprises:
a pin, wherein the pin is disposed through the first opening of the first member of the telescoping hitch and into a lumen of the first member; and
a spring disposed about at least a portion of the pin, and wherein the spring is disposed between an end of the pin and the first opening such that a force is applied to the pin to withdrawn the pin from at least one of the first opening and or second opening and when the force is released the spring causes the pin to extend further into the lumen of the first member;
wherein to position the telescoping hitch in one of the second positions, the pin is withdrawn from the second opening in the second member to allow the second member to extend away from the frame; and wherein when the telescoping hitch is retracted to dispose the telescoping hitch in the first position, the pin is disposed in the first opening of the first member and the second opening of the second member of the telescoping hitch;
and wherein the second member of the telescoping hitch is capable of coupling with a vehicle hitch; and two or more modular top components removably coupled to the platform via the fastener openings in the lateral supports, wherein the two or more modular top components comprises at least an A-frame and a second modular top component.

16. The modular wheeled cart of claim 15 further comprising a motor assembly coupled to the frame and configured to drive two or more of the at least four wheels.

17. The modular wheeled cart of claim 16 wherein the frame further comprises a battery channel configured to receive a removable battery such that when the removable battery is inserted into the channel it is capable of coupling with the motor assembly to provide power to the motor assembly.

18. The modular wheeled cart of claim 15 wherein the handle comprises a lock configured to allow the shaft of the handle to be retained in the first position.

19. The modular wheeled cart of claim 15 where the frame comprises separation members that allows a first axle coupling the first set of wheels and the second axle coupling the second set of wheels to be disposed at a distance from the platform.

20. The modular wheeled cart of claim 15 wherein the open regions in the platform allow at least one of:
an object or
a top member
to be coupled to the platform via strapping disposed about one or more of the lateral members of the platform.

* * * * *